(12) United States Patent
Yun et al.

(10) Patent No.: US 12,501,592 B2
(45) Date of Patent: Dec. 16, 2025

(54) ELECTRONIC DEVICE COMPRISING THERMAL DIFFUSION MEMBER

(71) Applicant: SAMSUNG ELECTRONICS CO., LTD., Suwon-si (KR)

(72) Inventors: Hajoong Yun, Suwon-si (KR); Yoonsun Park, Suwon-si (KR); Seunghoon Kang, Suwon-si (KR); Kyungha Koo, Suwon-si (KR); Hongki Moon, Suwon-si (KR); Jongkil Park, Suwon-si (KR); Yongjae Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 18/370,143

(22) Filed: Sep. 19, 2023

(65) Prior Publication Data

US 2024/0008232 A1 Jan. 4, 2024

Related U.S. Application Data

(63) Continuation of application No. PCT/KR2022/004984, filed on Apr. 6, 2022.

(30) Foreign Application Priority Data

Apr. 12, 2021 (KR) .................. 10-2021-0046978

(51) Int. Cl.
*H05K 7/20* (2006.01)
*H04M 1/02* (2006.01)
*H05K 5/02* (2006.01)

(52) U.S. Cl.
CPC ...... *H05K 7/20972* (2013.01); *H04M 1/0268* (2013.01); *H05K 5/0217* (2013.01)

(58) Field of Classification Search
CPC ............ H05K 7/20972; H05K 5/0217; H04M 1/0268
(Continued)

(56) References Cited

U.S. PATENT DOCUMENTS 8,675,363 B2 3/2014 Crooijmans et al.
2013/0027886 A1* 1/2013 Crooijmans .......... G06F 1/1624
361/704
(Continued)

FOREIGN PATENT DOCUMENTS

KR 10-2012-0129089 A 11/2012
KR 10-2018-0006533 A 1/2018
(Continued)

OTHER PUBLICATIONS

International Search Report (PCT/ISA/210) and Written Opinion (PCT/ISA/237) issued by the International Searching Authority on Jul. 8, 2022 in corresponding International Application No. PCT/KR2022/004984.

*Primary Examiner* — Zhengfu J Feng
(74) *Attorney, Agent, or Firm* — Sughrue Mion, PLLC

(57) ABSTRACT

An electronic device includes a first housing; a second housing slidable into and out of the first housing; a sliding plate configured to be at least partially slid within the second housing; a flexible display including a display area that is variable as the second housing slides into and out of the first housing; a printed circuit board in an inner space of the first housing; a first shaft; and a thermal diffusion member including a first end, disposed on the at least one electronic component and partially wound, and a second end coupled to the first shaft, and the thermal diffusion member is configured such that at least a portion of the thermal diffusion member spreads out in an inner space of the second (Continued)

housing as a sliding-out operation is performed by the second housing with respect to the first housing.

15 Claims, 17 Drawing Sheets

(58) Field of Classification Search
USPC .......................................................... 361/702
See application file for complete search history.

(56) References Cited

U.S. PATENT DOCUMENTS

| 2013/0058063 | A1* | 3/2013 | O'Brien | G06F 1/1624 |
| | | | | 361/807 |
| 2018/0014417 | A1* | 1/2018 | Seo | G09F 9/301 |
| 2018/0092253 | A1* | 3/2018 | Qiu | G06F 1/203 |
| 2020/0107458 | A1* | 4/2020 | Park | G06F 1/20 |
| 2020/0205301 | A1* | 6/2020 | Song | G09G 3/20 |
| 2020/0313112 | A1* | 10/2020 | Lee | G06F 1/1616 |
| 2020/0356143 | A1* | 11/2020 | Oh | G06F 1/1616 |
| 2022/0253103 | A1* | 8/2022 | Choi | G06F 1/1624 |

FOREIGN PATENT DOCUMENTS

| KR | 10-2020-0027760 A | 3/2020 |
| KR | 10-2020-0036409 A | 4/2020 |
| KR | 10-2113963 B1 | 5/2020 |
| KR | 10-2020-0076103 A | 6/2020 |
| KR | 10-2020-0115773 A | 10/2020 |
| KR | 10-2020-0129872 A | 11/2020 |
| WO | 2021/015310 A1 | 1/2021 |

* cited by examiner

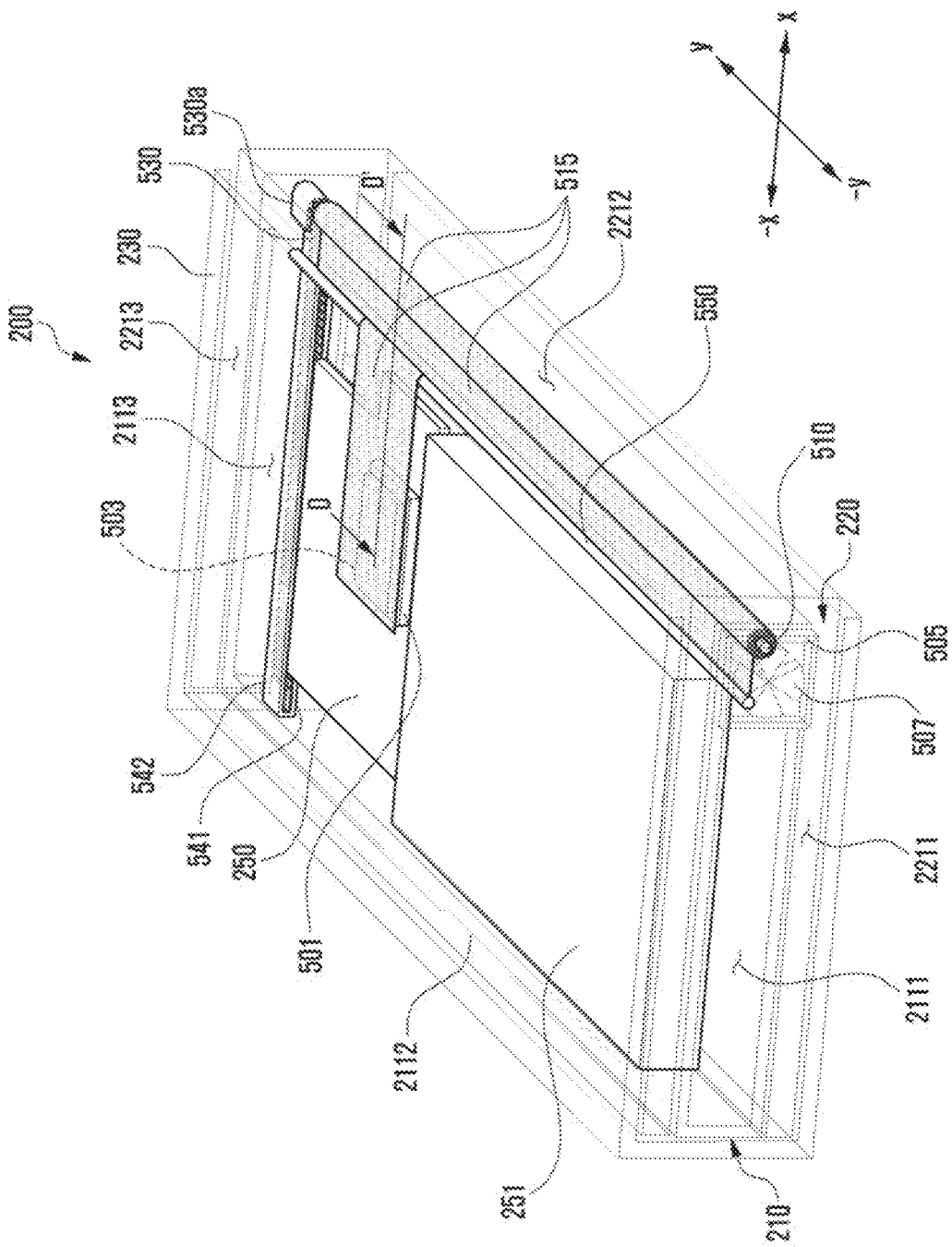

ELECTRONIC DEVICE COMPRISING THERMAL DIFFUSION MEMBER

CROSS-REFERENCE TO RELATED APPLICATIONS

This application is by-pass continuation application of International Application No. PCT/KR2022/004984, filed on Apr. 6, 2022, which based on and claims priority to Korean Patent Application No. 10-2021-0046978, filed on Apr. 12, 2021, in the Korean Intellectual Property Office, the disclosures of which are incorporated by reference herein in their entireties.

BACKGROUND

1. Field

The disclosure relates to an electronic device comprising a thermal diffusion member.

2. Description of Related Art

The use of electronic devices (e.g., smartphones) such as slidable or rollable types is increasing and various functions are being provided to electronic devices.

Electronic device that are easy to carry and can expand the display in a sliding manner to provide a wider screen for the user are being developed.

For example, in an electronic device of a slidable type or a rollable type, a portion of the flexible display may be slid into the housing or slid out of the housing.

A slidable electronic device (e.g., a rollable electronic device) includes a flexible display in which an exposed area thereof may be reduced and enlarged. The first housing (e.g., the base housing) and the second housing (e.g., the slide housing) of the slidable electronic device may be flexibly coupled to each other in such a way that they are at least partially fitted together.

The slidable electronic device may change the display area of the flexible display by at least a portion of the second housing being slid into the first housing, or at least a portion of the second housing being slid out of the first housing.

To provide various functions to the user, the electronic device may dispose on a printed circuit board at least one electronic component such as an application processor (AP), a communication processor (CP), a power management integrated circuit (PMIC) and/or a power amplifier.

The electronic device may generate a heat generation problem when at least one electronic component disposed on the printed circuit board operates.

In the case that the electronic device does not diffuse and dissipate heat generated from at least one electronic component disposed on the printed circuit board to another area and/or the outside, the electronic component may not operate normally and the service life may be shortened.

SUMMARY

Provided is an electronic device including a thermal diffusion member that may diffuse and dissipate heat generated from at least one electronic component (e.g., an AP, a CP, a PMIC and/or a power amplifier) to a designated space and/or the outside of the electronic device during the sliding-out operation of the electronic device.

Additional aspects will be set forth in part in the description which follows and, in part, will be apparent from the description, or may be learned by practice of the presented embodiments.

According to an aspect of the disclosure, an electronic device includes: a first housing including a first side surface, a second side surface, and a third side surface; a second housing including a fourth side surface, a fifth side surface, and a sixth side surface, the second housing being configured to be slidable into and out of the first housing; a sliding plate including a first end coupled to the first housing, and a second end configured to be at least partially slid within the second housing; a flexible display supported by the first housing and the second housing and including a display area that varies as the second housing slides into and out of the first housing; a printed circuit board disposed in an inner space of the first housing; at least one electronic component mounted on a side of the printed circuit board; a first shaft including a first end coupled to the fourth side surface of the second housing, and a second end coupled to the sixth side surface of the second housing; and a thermal diffusion member including a first end disposed on the at least one electronic component and a second end coupled to the first shaft, the thermal diffusion member being configured to be partially wound around and unwound from the first shaft, wherein the thermal diffusion member is configured such that at least a portion of the thermal diffusion member spreads out in an inner space of the second housing as a sliding-out operation is performed by the second housing with respect to the first housing.

The at least one electronic component may include at least one of an application processor, a communication processor, a power management integrated circuit (PMIC), a power amplifier, or an inductor.

The electronic device may further include a heat transfer member disposed between the at least one electronic component and the first end of the thermal diffusion member.

The electronic device may further include a cooling member disposed on an inner surface of the first side surface of the first housing and configured to operate when the sliding-out operation is performed.

The cooling member may include one of a micropump or a piezo pump.

The first end of the first shaft may be coupled to the fourth side surface of the second housing, and the second end of the first shaft may be coupled to the sixth side surface of the second housing.

The electronic device may further include a second shaft disposed on an outer circumferential surface of the second end of the first shaft, the second shaft being configured to be rotated along with a rotation of the first shaft.

The first shaft may include a body portion configured to wind the thermal diffusion member.

A width of the first end of the thermal diffusion member may be narrower than a width of the second end of the thermal diffusion member.

The thermal diffusion member may include one of a graphite sheet, a nanofiber sheet, a nanofoam sheet, a copper sheet, or an aluminum sheet.

The electronic device may further include a sliding member on an outer surface of the second shaft, the sliding member being configured to reciprocate, by one or more gears, between the first housing and the second housing.

A first end of the sliding member may be coupled to the third side surface of the first housing.

The electronic device may further include a first guide member and a second guide member disposed on an inner surface of the sixth side surface of the second housing, and the sliding member may be partially provided between the first guide member and the second guide member.

When the second housing slides out from the first housing and a rotation occurs in the second shaft, a remaining portion of the sliding member may be moved and disposed in the inner space of the second housing in a state that the first end of the sliding member is fixed to the third side surface of the first housing.

The electronic device may further include a rotating member including a first end rotatably coupled to the first side surface of the first housing, and a second end rotatably coupled to the third side surface of the first housing.

According to one or more embodiments of the present disclosure, the surface temperature of the electronic device can be lowered and the performance and life of electronic components can be improved by diffusing and dissipating the heat from at least one heat generating component to a designated space (e.g., the inner space of the second housing) in the electronic device and/or to the outside using a thermal diffusion member wound up on the shaft (e.g., a fixed shaft) during the sliding-in operation of the electronic device and provided to be spread out from the shaft during the sliding-out operation.

BRIEF DESCRIPTION OF THE DRAWINGS

The above and other aspects, features, and advantages of specific embodiments of the present disclosure will be more apparent from the following description with reference to the accompanying drawings, in which:

FIG. 5A is a schematic view of an electronic device viewed from one direction (e.g., the −y axis direction) when the electronic device is in the slide-in state according to one or more embodiments of the present disclosure;

DETAILED DESCRIPTION

Figure 1:
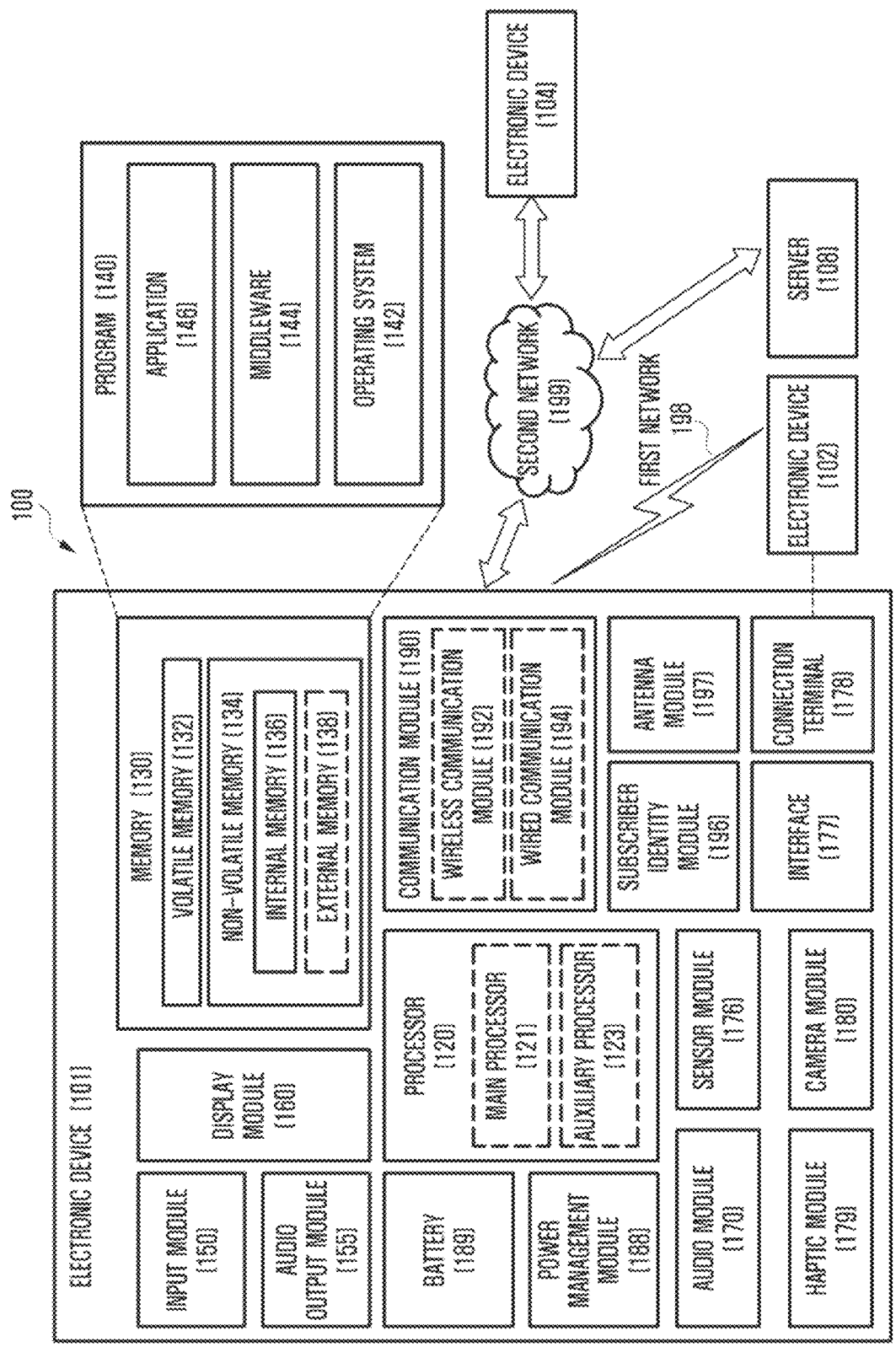
FIG. 1 is a block diagram of an electronic device in a network environment according to one or more embodiments of the present disclosure.

FIG. 1 is a block diagram of an electronic device 101 in a network environment 100 according to an embodiment.

With reference to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connecting terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for slide-in calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5$^{th}$ generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input/output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In another embodiment of the disclosure, the external electronic device 104 may include an internet of things (IoT) device. The server 108 may be an intelligent server using machine learning and/or neural networks.

According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Figure 2A:
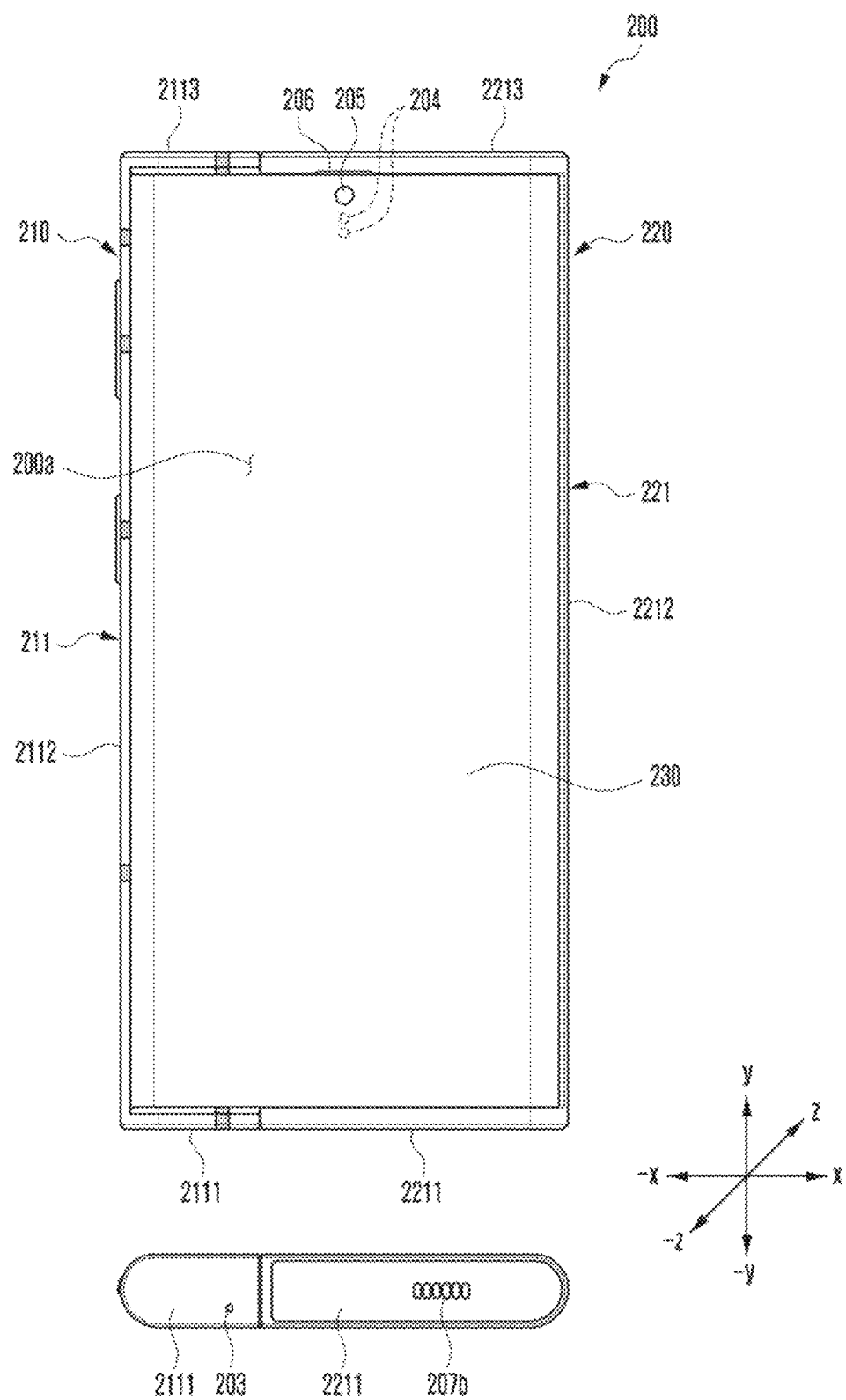
FIG. 2A is a diagram illustrating the front surface and side surface of an electronic device according to one or more embodiments of the present disclosure when the electronic device is in a slide-in state.
Figure 2B:
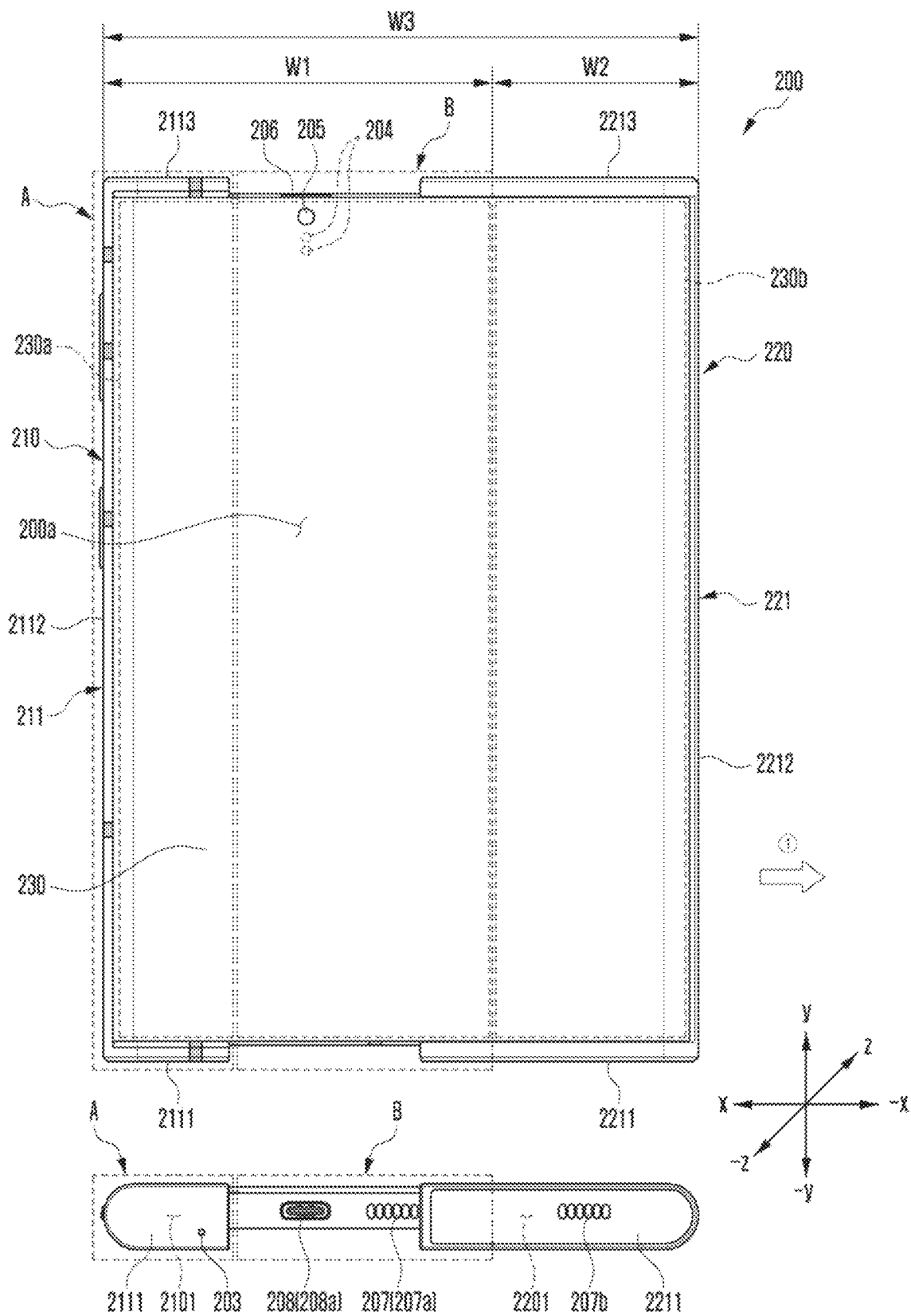
FIG. 2B is a diagram illustrating the front surface and side surface of an electronic device according to one or more embodiments of the present disclosure when the electronic device is in a slide-out state.
Figure 3A:
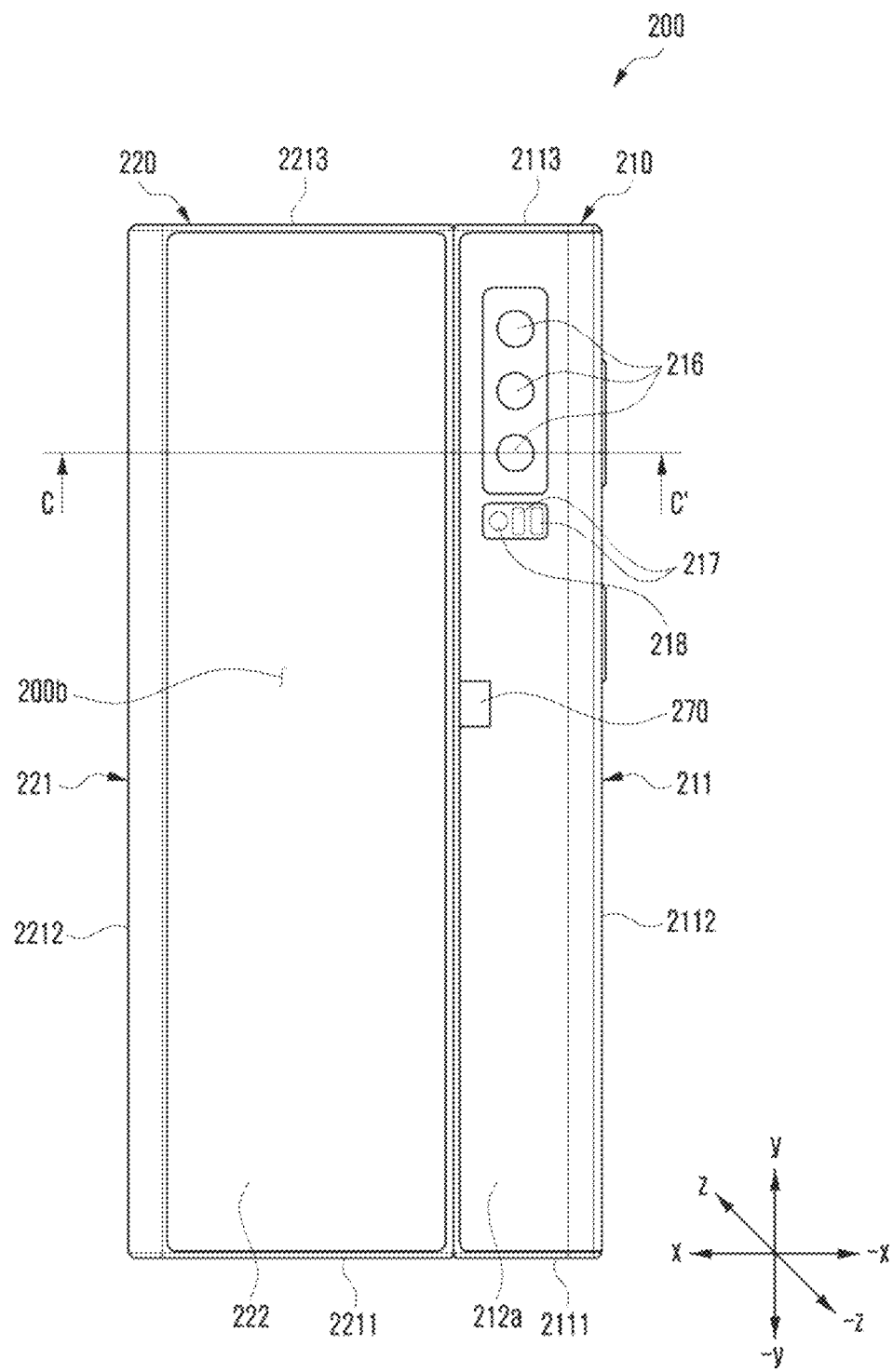
FIG. 3A is a diagram illustrating the rear surface of an electronic device according to one or more embodiments of the present disclosure when the electronic device is in a slide-in state.
Figure 3B:
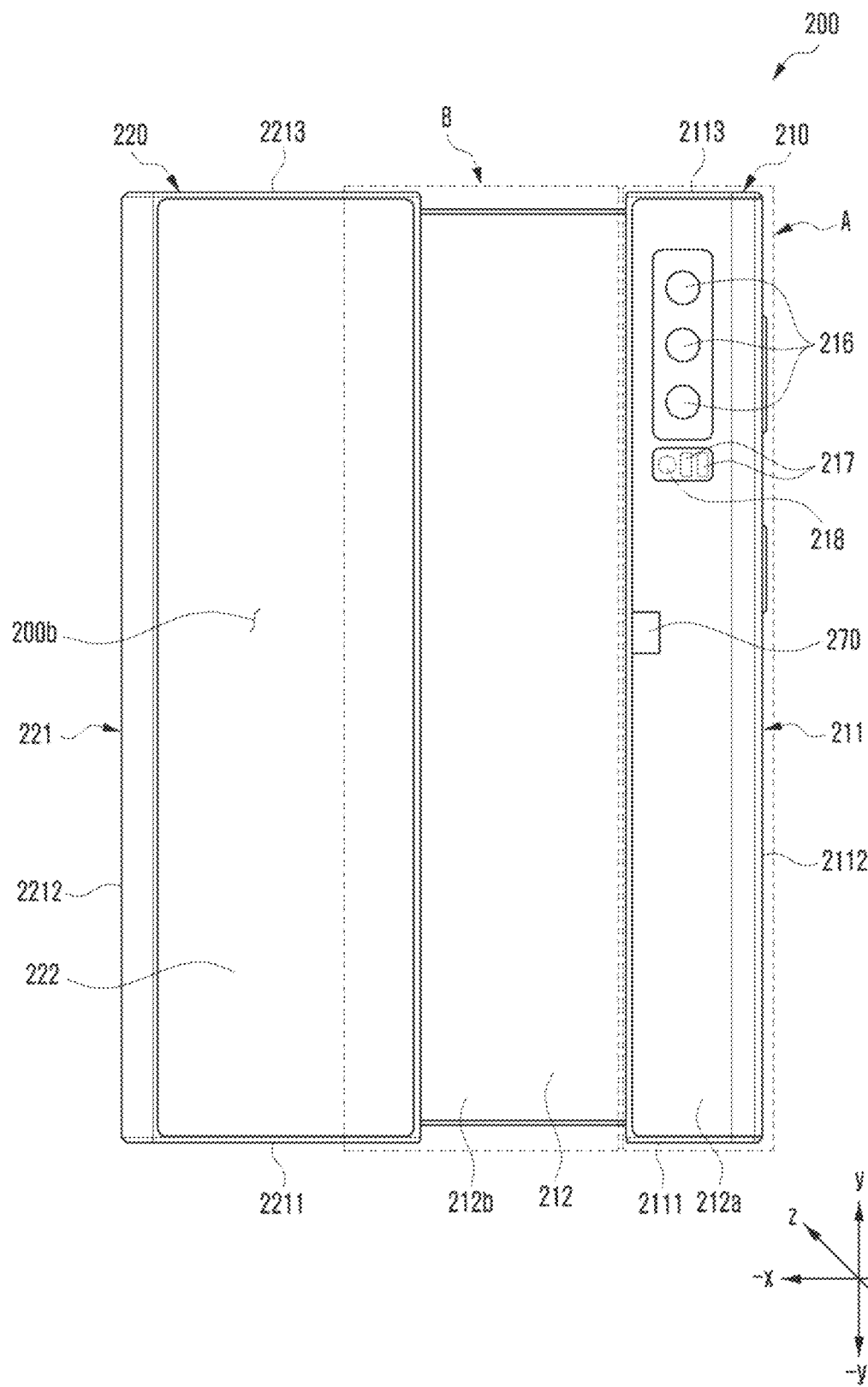
FIG. 3B is a diagram illustrating the rear surface of an electronic device according to embodiments of the present disclosure when the electronic device is in a slide-out state.

FIG. 2A shows diagrams illustrating the front surface and side surface of an electronic device according to one or more embodiments of the present disclosure when the electronic device is in a slide-in state. FIG. 2B shows diagrams illustrating the front surface and side surface of an electronic device according to embodiments of the present disclosure when the electronic device is in a slide-out state. FIG. 3A shows diagrams illustrating the rear surface of an electronic device according to one or more embodiments of the present disclosure when the electronic device is in a slide-in state. FIG. 3B shows diagrams illustrating the rear surface of an electronic device according to one or more embodiments of the present disclosure when the electronic device is in a slide-out state According to one or more embodiments, the electronic device 200 of FIG. 2A, FIG. 2B, FIG. 3A, AND FIG. 3B may include the electronic device 101 of FIG. 1.

With reference to FIG. 2A, FIG. 2B, FIG. 3A, AND FIG. 3B, the electronic device 200 may include a first housing 210 (e.g., a base housing), a second housing 220 (e.g., a slide housing) movably coupled in a first direction (e.g., the direction 1̂, the x-axis direction) designated from the first housing 210 and in a designated reciprocating distance from the first housing 210, and a flexible display 230 (e.g., an expandable display) disposed to be supported through at least a portion of the first housing 210 and the second housing 220.

According to embodiments, the electronic device 200, in a slide-out state, may form at least partially the same plane as at least a portion of the first housing 210, and, in a slide-in state, may include a sliding plate (e.g., the sliding plate 240 of FIG. 4) at least partially accommodated in the inner space (e.g., the second space 2201 of FIG. 2B and/or FIG. 4) of the second housing. The sliding plate 240 may include, for example, one of an articulated support plate, an articulated hinge module, and a bendable member or a bendable support member.

According to embodiments, at least a portion of the flexible display 230, in the slide-in state, may be disposed to be invisible from the outside by being supported by a sliding plate (e.g., the sliding plate 240 of FIG. 4) and by being accommodated in the inner space (e.g., the second space 2201 of FIG. 2B or FIG. 4) of the second housing 220. At least a portion of the flexible display 230, in the slide-out state, may be disposed to be visible from the outside by being supported by a sliding plate (e.g., the sliding plate 240 of FIG. 4) that forms at least partially the same plane as the first housing 210.

According to one or more embodiments, the electronic device 200 may include a front surface 200a (e.g., the first surface), a rear surface 200b (e.g., the second surface) facing the opposite direction from the front surface 200a, and a side surface surrounding the space between the front surface 200a and the rear surface 200b. The first housing 210 of the electronic device 200 may include a first lateral member 211. The second housing 220 may include a second lateral member 221.

According to embodiments, the first lateral member 211 may include a first side surface 2111 having a first length along the first direction (e.g., the x-axis direction), a second side surface 2112 extending to have a second length longer than the first length along a direction substantially perpendicular to the first side surface 2111, and a third side surface 2113 extending substantially parallel to the first side surface 2111 from the second side surface 2112 and having a first length. The first lateral member 211 may be at least partially formed of a conductive material (e.g., a metal). At least a portion of the first lateral member 211 may include a first support member 212 extending to at least a portion of the inner space (e.g., the first space 2101 of FIG. 2B and/or FIG. 4) of the first housing 210.

According to one or more embodiments, the second lateral member 221 may include a fourth side surface 2211 corresponding at least partially to the first side surface 2111 and having a third length, a fifth side surface 2212 extending from the fourth side surface 2211 in a direction substantially parallel to the second side surface 2112 and having a fourth length longer than the third length, and a sixth side surface 2213 extending from the fifth side surface 2212 to correspond to the third side surface 2113 and having the third length. The second lateral member 221 may be at least partially formed of a conductive material (e.g., a metal). At least a portion of the second lateral member 221 may include a second support member 222 extending to at least a portion of the inner space of the second housing 220 (e.g., the second space 2201 of FIG. 2B and/or FIG. 4).

According to embodiments, the first side surface 2111 and the fourth side surface 2211, and the third side surface 2113 and the sixth side surface 2213 may be slidably coupled with respect to each other. In the case that the electronic device 200 is in the slide-in state, at least a portion of the first side surface 2111 may be disposed to overlap with at least a portion of the fourth side surface 2211 so that the remaining portion of the first side surface 2111 may be visible from the outside. In the case that the electronic device 200 is in the slide-in state, at least a portion of the third side surface 2113 may be disposed to overlap with at least a portion of the sixth side surface 2213 so that the remaining portion of the third side surface 2113 may be visible from the outside.

According to embodiments, in the case that the electronic device 200 is in the slide-in state, at least a portion of the first support member 212 of the first lateral member 211 may be disposed to overlap with the second support member 222 of the second lateral member 221 so that the remaining portion of the first support member 212 may be visible from the outside. The first support member 212 may include a non-overlapping portion 212a that does not overlap with the second support member 222 and an overlapping portion 212b that overlaps with the second support member 222 in the slide-in state. In some embodiments, the non-overlapping portion 212a and the overlapping portion 212b may be integrally formed. In some embodiments, the non-overlapping portion 212a and the overlapping portion 212b may be separately provided and structurally combined.

Figure 4:
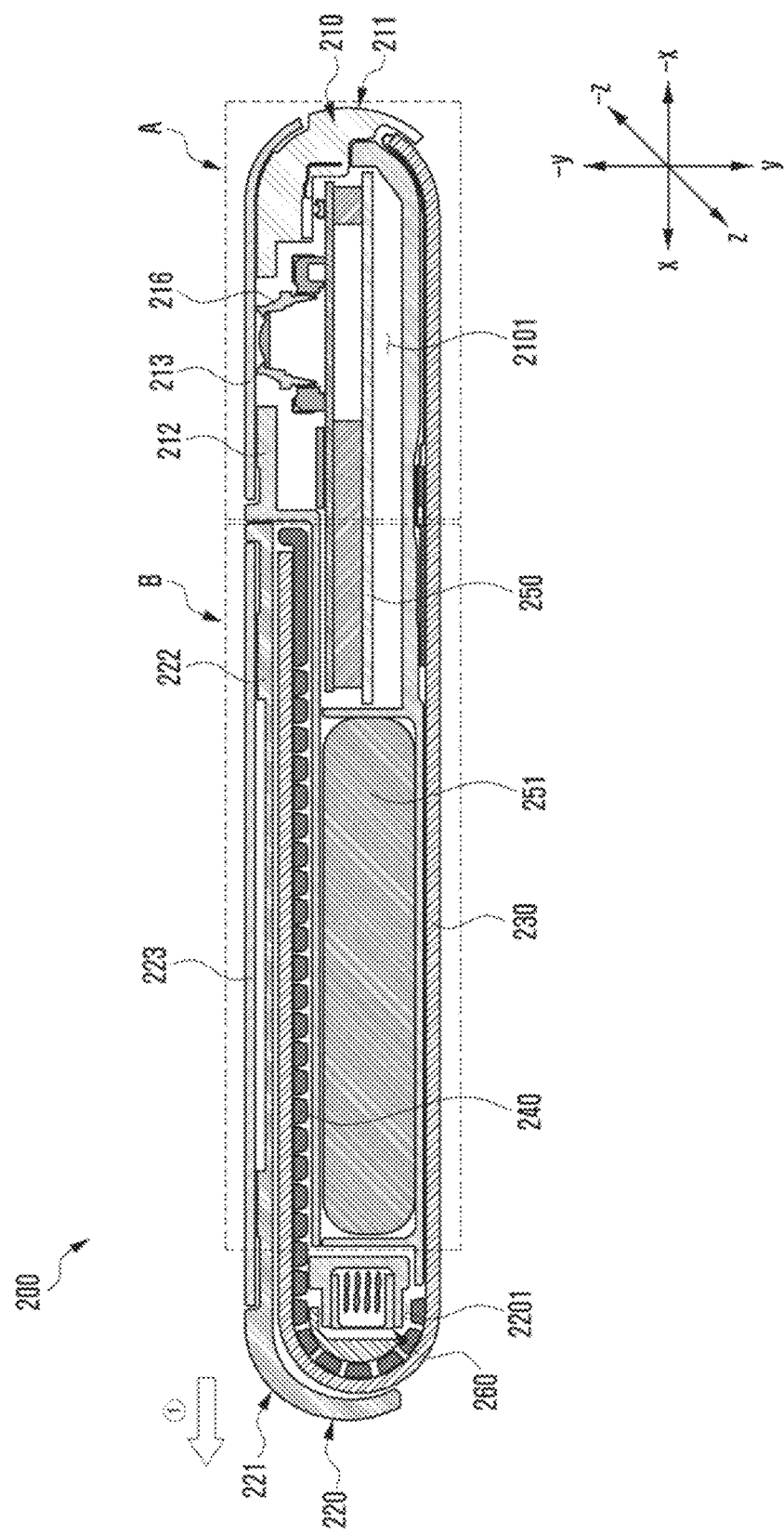
FIG. 4 is a diagram schematically illustrating a cross-section for the C-C' line, of FIG. 3A, of an electronic device according to one or more embodiments of the present disclosure.

According to one or more embodiments, the first housing 210 may include a first subspace A corresponding to the non-overlapping portion 212a and a second subspace B corresponding to the overlapping portion 212b in the first space (e.g., the first space 2101 of FIG. 2B and/or FIG. 4). The first subspace A and the second subspace B may be disposed in such a way as to be connected to each other or separated. The first subspace A may be formed to have a larger space volume than the second subspace B.

According to embodiments, the electronic device 200 may include a plurality of electronic components (e.g., a camera module 216, a sensor module 217, a flash 218, a printed circuit board (e.g., a printed circuit board 250 of FIG. 4)) or a battery (e.g., a battery 251 of FIG. 4) disposed in the first space (e.g., the first space 2101 of FIG. 2B and/or FIG. 4) of the first housing 210.

According to embodiments, the first subspace A, for example, may be used as an area disposing electronic components (e.g., a camera module 216, a sensor module 217, or a flash 218) that require a relatively large mounting space (or a relatively large mounting thickness) or must be operated by avoiding an overlapping structure. The second subspace B, for example, may be used as an area disposing electronic components (e.g., the printed circuit board 250 of FIG. 4 or the battery (e.g., the battery 251 of FIG. 4)) that require a relatively small mounting space (or a relatively small mounting thickness) or can be operated regardless of the overlapping structure.

According to one or more embodiments, the areas of the front surface 200a and the rear surface 200b of the electronic device 200 may vary according to the slide-in state and the slide-out state. In some embodiments, the electronic device 200, in the rear surface 200b, may include a first rear surface cover (e.g., the first rear surface cover 213 of FIG. 4) disposed on at least a portion of the first housing 210 and a second rear surface cover (e.g., the second rear surface cover 223 of FIG. 4) disposed on at least a portion of the second housing 220. The first rear surface cover 213 and/or the second rear surface cover 223 may be integrally formed with each of the first lateral member 211 and the second lateral member 221. The first rear surface cover 213 and/or the second rear surface cover 223 may be separately disposed on the first support member 212 and the second support member 222.

According to embodiments, the first rear surface cover 213 and/or the second rear surface cover 223 may be a polymer, a coated or colored glass, a ceramic, a metal (e.g., an aluminum, a stainless steel (STS), or a magnesium), or a combination of at least two of the above materials. In some embodiments, the first rear surface cover 213 and/or the second rear surface cover 223 may be extended to at least a portion of each of the first lateral member 211 and the second lateral member 221. In some embodiments, at least a portion of the first support member 212 may be replaced by the first rear surface cover 213, and at least a portion of the second support member 222 may be replaced by the second rear surface cover 223.

According to one or more embodiments, the electronic device 200 may include a flexible display 230 disposed to be supported by at least a portion of the first housing 210 and the second housing 220. The flexible display 230 may include a first portion 230a (e.g., a plane portion) visible from the outside both in the slide-in state and the slide-out state and a second portion 230b (e.g., a bendable portion) extending from the first portion 230a and sliding into the inner space (e.g., the second space of FIG. 4) of the second housing 220 to be invisible from the outside in the slide-in state. The first portion 230a may be disposed to be supported by the first housing 210, and the second portion 230b may be disposed to be supported by at least a portion of the sliding plate (e.g., the sliding plate 240 of FIG. 4).

According to embodiments, the flexible display 230 may be disposed so that it may extend from the first portion 230a while being supported by the sliding plate (e.g., the sliding plate 240 of FIG. 4), form substantially the same plane as the first portion 230a, and be visible from the outside in a state that the second housing 220 slides out along the designated first direction (e.g., the direction 1̂, the x-axis direction). The second portion 230b of the flexible display 230 may be disposed so that it may be slid into the inner space (e.g., the second space 2201 of FIG. 2B or FIG. 4) and be invisible from the outside in a state that the second housing 220 slides in along the designated second direction (e.g., the direction opposite to the direction 1̂, the −x-axis direction). In the electronic device 200, the display area of the flexible display 230 may vary as the second housing 220 moves in a sliding manner along the designated direction from the first housing 210.

According to one or more embodiments, the first housing 210 and the second housing 220 may be operated in a sliding manner so that the overall width is variable with respect to each other. The electronic device 200 may be configured to have a first width W1 from the second side surface 2112 to the fifth side surface 2212 in the slide-in state. The electronic device 200 may be configured to have a third width W3 greater than the first width W1 by moving a portion of the sliding plate (e.g., the sliding plate 240 of FIG. 4) slid into the inner space of the second housing 220 (e.g., the second space 2201 of FIG. 4) in the slide-out state. For example, the flexible display 230 may have a display area of substantially first width W1 in the slide-in state. The flexible display 230 may have a display area of substantially third width W3 extended from the first width W1 to the second width W2 in the slide-out state.

According to one or more embodiments, the slide-out operation of the electronic device 200 may be performed through the operation of the user. For example, the second housing 220 may be slid out in a designated first direction (e.g., the direction of î, the x-axis direction) through the operation of the locker 270 exposed through the rear surface 200b of the electronic device. In this case, the locker 270 may be disposed in the first housing 210 and may interrupt the second housing 220 to keep the second housing 220, which is pressurized in the slide-out direction (e.g., the direction î) through the sliding drive unit (e.g., the sliding drive unit 260 of FIG. 4) to be described later, to be in a slide-in state. In some embodiments, the electronic device 200 may be driven in a slide-out state through the operation of a user who presses the outer surface of the flexible display 230 in a designated direction (the direction î), the x-axis direction) in the slide-in state. In some embodiments, the second housing 220 may be automatically operated through a drive mechanism (e.g., a drive motor, a deceleration module, and/or a gear assembly) disposed in the inner space (e.g., the first space 2101 of FIG. 4) of the first housing 210 and/or the inner space (e.g., the second space 2201 of FIG. 4) of the second housing 220.

According to embodiments, the electronic device 200 may be configured to control the operation of the second housing 220 through a drive mechanism in the case of detecting an event for driving the slide-in state and/or the slide-out state of the electronic device 200 through a processor (e.g., the processor 120 of FIG. 1). The processor of the electronic device 200 (e.g., the processor 120 of FIG. 1) may control the flexible display to display an object in various ways and execute an application in response to the changed display area of the flexible display 230 according to the slide-in state, the slide-out state, or the intermediate state (e.g., including a free stop state). A processor (e.g., the processor 120 of FIG. 1) may be disposed on the printed circuit board 250 of the first housing 210. The processor may include an AP and/or a CP.

According to one or more embodiments, the electronic device 200 may include at least one of an input module 203 (e.g., the input module 150 of FIG. 1) disposed in the first space of the first housing 210 (e.g., the first space 2101 of FIG. 4), a sound output module 206 and 207 (e.g., the sound output module 155 of FIG. 1), a sensor module 204 and 217 (e.g., the sensor module 176 of FIG. 1), a camera module 205 and a camera module 216 (e.g., the camera module 180 of FIG. 1), a connector port 208, a key input device, or an indicator. The electronic device 200 may be configured to omit at least one of the above-described components or to additionally include other components.

According to one or more embodiments, the input module 203 (e.g., the input module 150 of FIG. 1) may include a microphone. The input module 203 may include a plurality of microphones disposed to detect the direction of sound. The sound output module 206 and the sound output module 207 (e.g., the sound output module 155 of FIG. 1) may include a speaker. The sound output module 206 and the sound output module 207 may include a receiver 206 for a call and an external speaker 207. The external speaker 207 may face the outside through a first speaker hole 207a disposed in the first housing 210 when the electronic device 200 is in a slide-out state. The external speaker 207 may face the outside through the first speaker hole 207a and the second speaker hole 207b formed in the second housing 220 to correspond to the first speaker hole 207a when the electronic device 200 is in a slide-in state.

According to one or more embodiments, the sensor module 204 and the sensor module 217 (e.g., the sensor module 176 of FIG. 1) may generate an electrical signal or data value corresponding to an internal operating state of the electronic device 200 or an external environmental state. The sensor module 204 and the sensor module 217 may include, for example, a first sensor module 204 (e.g., a proximity sensor or an illuminance sensor) disposed on the front surface 200a of the electronic device 200 and/or a second sensor module 217 (e.g., a heart rate monitoring (HRM) sensor) disposed on the rear surface 200b of the electronic device 200. The first sensor module 204 and/or the second sensor module 217 may include at least one of a proximity sensor, an illuminance sensor, a time of flight (TOF) sensor, an ultrasonic sensor, a fingerprint recognition sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, or a humidity sensor.

According to one or more embodiments, the camera module 205 and the camera module 216 (e.g., the camera module 180 of FIG. 1) may include a first camera module 205 disposed in the front surface 200a of the electronic device 200 and a second camera module 216 disposed in the rear surface 200b of the electronic device 200. The electronic device 200 may include a flash 218 located near the second camera module 216. The camera modules 205 and 216 may include one or a plurality of lenses, an image sensor, and/or an image signal processor. The first camera module 205 may be disposed under the flexible display 230 and may be configured to photograph the subject through a portion of the active areas of the flexible display 230. The flash 218 may include, for example, a light-emitting diode or a xenon lamp.

According to one or more embodiments, the first camera module 205 of the camera module 205 and the camera module 216, and some sensor module 204 of the sensor module 204 and the sensor module 217 may be disposed to detect the external environment through the flexible display 230. For example, the first camera module 205 or some sensor module 204 may be disposed in the inner space of the electronic device 200 to face the external environment through an opening or transmission area perforated in the flexible display 230. The area facing the first camera module 205 of the flexible display 230 may be formed as a transmission area having a designated transmittance as part of the area displaying content.

According to one or more embodiments, the connector port 208 may face the outside through a connector port hole 208a formed in the first housing 210 when the electronic device 200 is in a slide-out state. The connector port 208 may be covered to be invisible from the outside through the second housing 220 when the electronic device 200 is in a slide-in state. The connector port 208 may face the outside through another connector port hole formed in the second housing 220 to correspond to the connector port hole 208a even when the electronic device 200 is in the slide-in state. The sound output module 206 may include a speaker (e.g., piezo speaker) operating without a separate speaker hole.

FIG. 4 is a diagram schematically illustrating a cross-section for the C-C' line, of FIG. 3A, of an electronic device according to one or more embodiments of the present disclosure.

With reference to FIG. 4, the electronic device 200 according to one or more embodiments of the present disclosure may include a first housing 210 having a first space 2101, a second housing having a second space 2201, a sliding plate 240 connected to the first housing 210 and at least partially accommodated in the second space 2201 in a slide-in state, a flexible display 230 disposed to be supported by at least portion of the sliding plate 240 and at least a portion of the first housing 210, and a sliding drive unit 260 disposed in the first housing 210 and pressing the second housing 220 in the first direction (e.g., the direction Î, the x-axis direction) from which the second housing slides out.

According to embodiments, the electronic device 200 may include at least one electronic component. At least one electronic component may be mounted on the printed circuit board 250 disposed in the first space 2101 of the first housing 210. At least one electronic component may include a heat generating component such as an AP, a CP, a PMIC, a power amplifier, and/or an inductor. The first space 2101 may be connected to a first subspace A having a first space volume and a second subspace B having a second space volume smaller than the first space volume. The second subspace B may include a space corresponding to an area where a portion of the first housing 210 overlaps with a portion of the second housing 220 when the electronic device 200 is in a slide-in state.

According to one or more embodiments, the first electronic component, among at least one electronic component, that requires a relatively large mounting space, requires a relatively large mounting thickness of the electronic device 200, or must be operated by avoiding the overlapping structure of the first housing 210 and the second housing 220, may be disposed in the first subspace A. For example, the first electronic component may include a camera module 216, and a sensor module (e.g., a sensor module 217 of FIG. 3*b*, or a flash (e.g., a flash 218 of FIG. 3*b*)). In this case, at least a portion of the first electronic components may be disposed to face the external environment through the first support member 212 and/or the first rear surface cover 213. A second electronic component, among at least one electronic component, that requires a relatively small mounting space, requires a relatively small mounting thickness of the electronic device 200, or can be operated regardless of the overlapping structure of the first housing 210 and the second housing 220, may be disposed in the second subspace B. For example, the second electronic component may include a battery 251. In some embodiments, some of the electronic components (e.g., a PCB 250 or flex PCB (FPCB)) of at least one electronic component may be co-located in the first subspace A and the second subspace B when the first subspace A and the second subspace B are connected. In some embodiments, the first electronic component (e.g., the printed circuit board 250) and the second electronic component (e.g., the battery 251) may be disposed in the first housing 210.

The electronic device 200 according to one or more embodiments of the present disclosure may form an effective thermal diffusion structure by diffusing the heat generated from at least one electronic component (e.g., the electronic component 501 of FIG. 5A to FIG. 6*b*) to a designated space (e.g., the second space 2201 of FIG. 2*b* or FIG. 4) of the electronic device 200 and/or to the outside using a thermal diffusion member 515 wound up on the first shaft (e.g., the first shaft 510 of FIG. 5A, FIG. 5B, FIG. 6A, FIG. 6B, and FIG. 7) when the second housing 220 slides into the first housing 210 (e.g., a slide-in operation) and provided to be spread out from the first shaft 510 when the second housing 220 slides out from the first housing 210 (e.g., a slide-out operation).

Hereinafter, the heat dissipation structure of the electronic device 200 (e.g., the electronic device 101 of FIG. 1) including the thermal diffusion member 515 according to one or more embodiments of the present disclosure will be described with reference to the drawings described below.

In the description of the drawings described below, the same reference number may be assigned for a configuration that is substantially the same as the embodiment disclosed in the electronic device 200 of FIGS. 2A, FIG. 2B, FIG. 3A, FIG. 3B, and FIG. 4 described above, and duplicate descriptions of functions and operations thereof may be omitted.

Figure 5B:
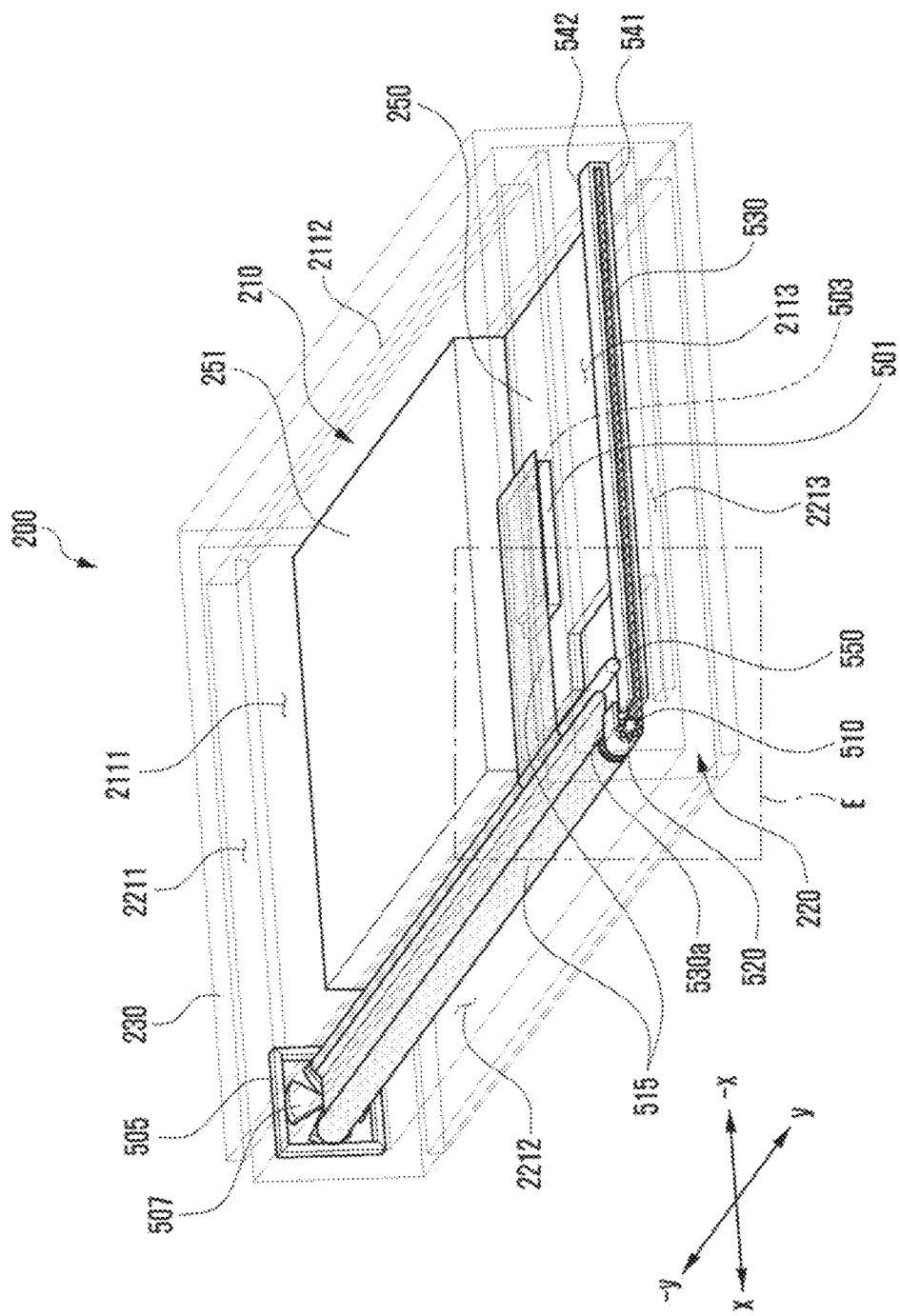
FIG. 5B is a schematic view of an electronic device viewed from a direction different from one direction (e.g., the y-axis direction) when the electronic device is in the slide-in state according to one or more embodiments of the present disclosure.
Figure 6A:
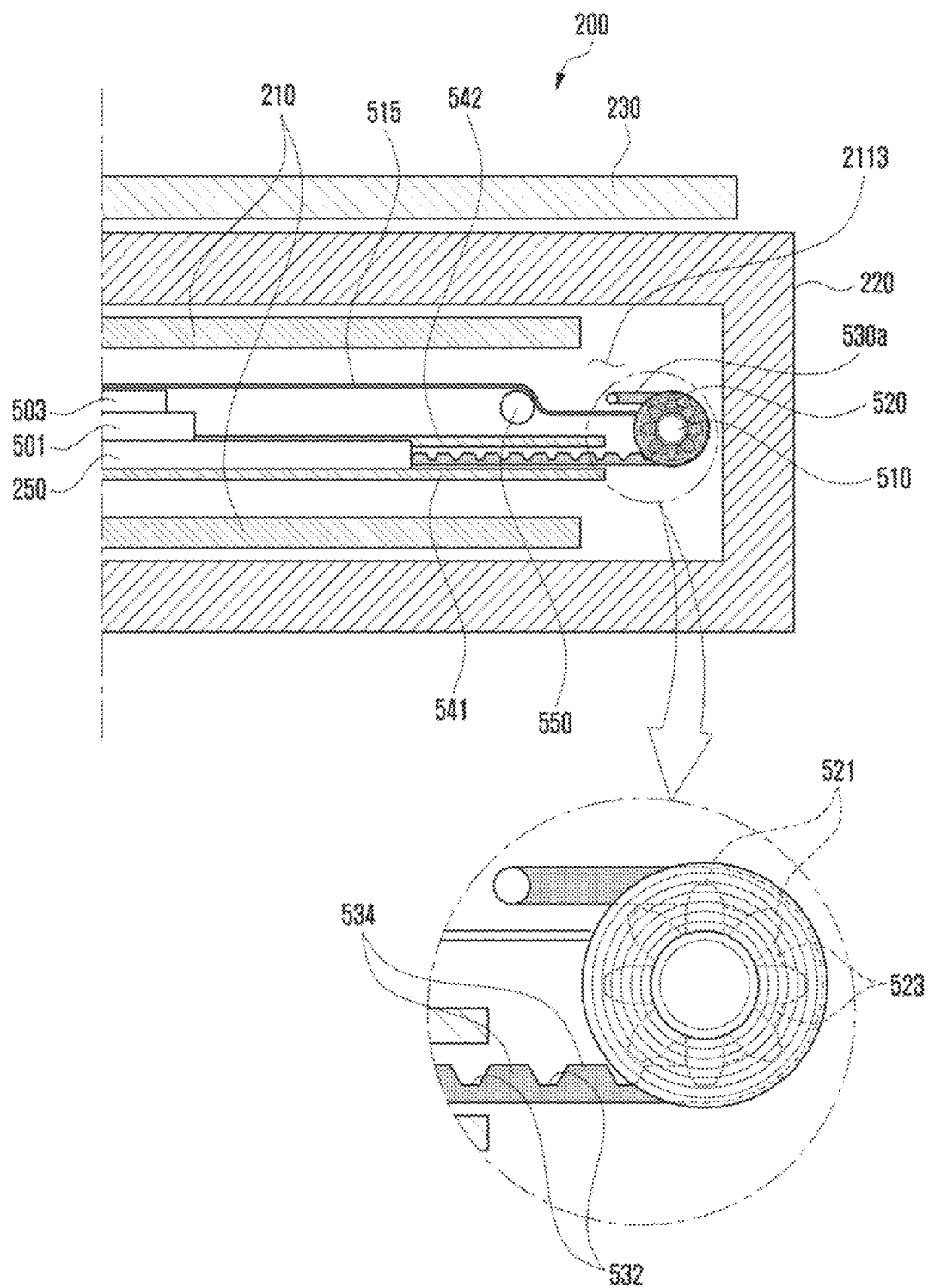
FIG. 6A is a diagram schematically illustrating a cross-section for the D-D' line, of FIG. 5A, of an electronic device according to one or more embodiments of the present disclosure.
Figure 6B:
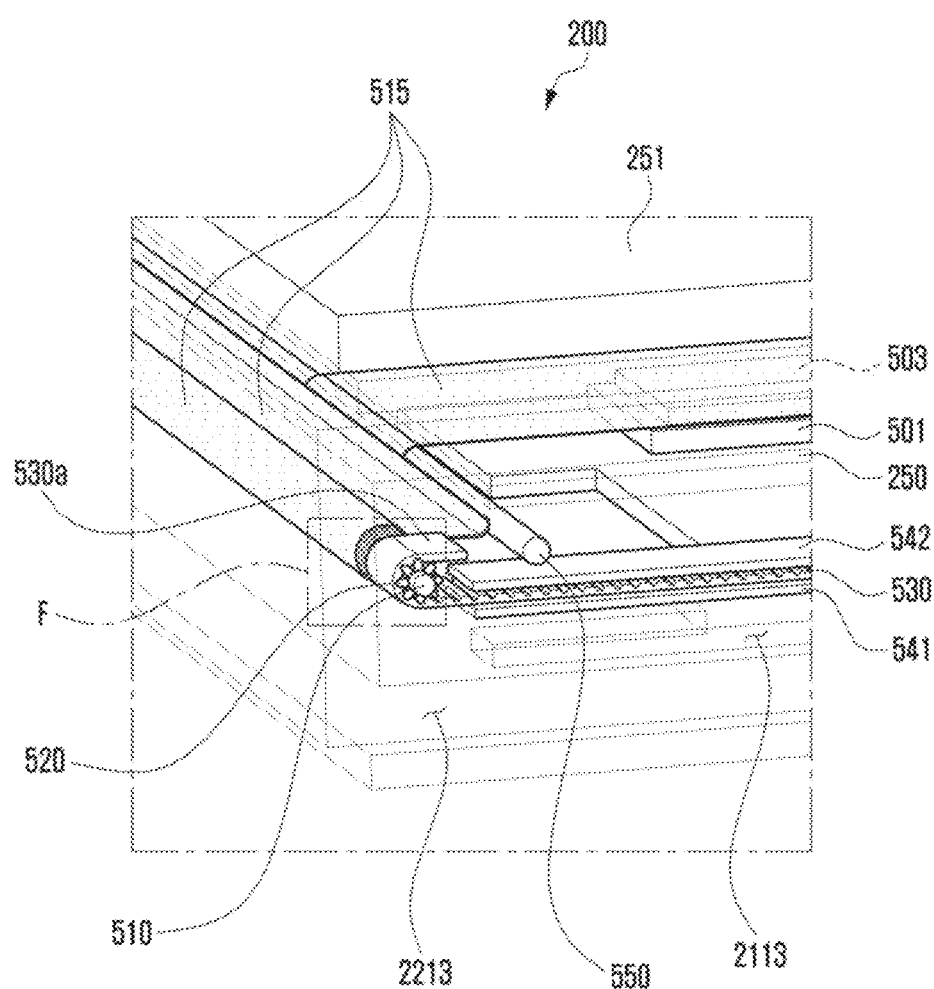
FIG. 6B is an enlarged view of the E area, of FIG. 5B, of an electronic device according to one or more embodiments of the present disclosure.
Figure 7:
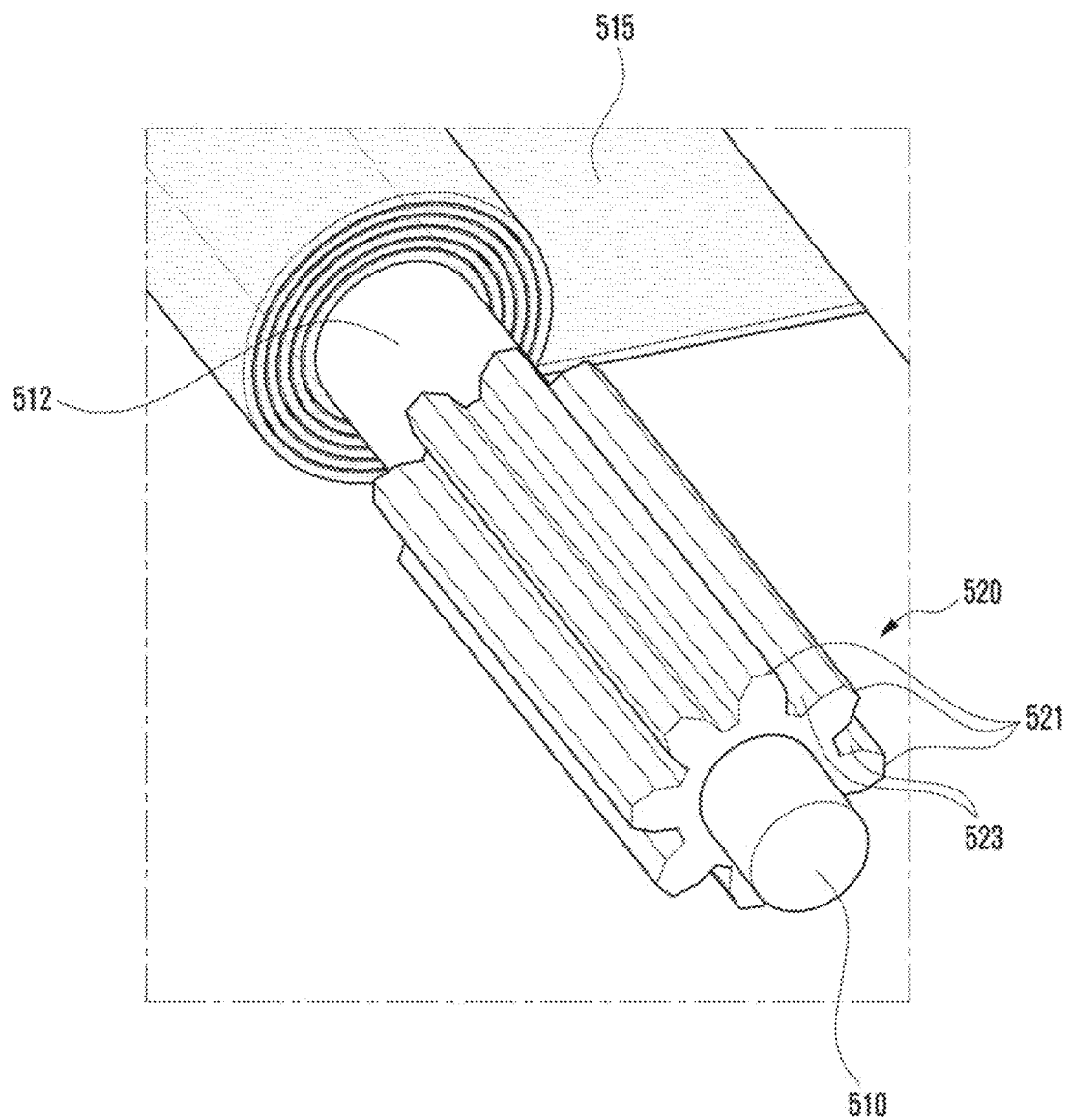
FIG. 7 is an enlarged view of a state in which a sliding member is removed in the F area, of FIG. 6B, of an electronic device according to one or more embodiments of the present disclosure.

FIG. 5A is a schematic view of an electronic device viewed from one direction (e.g., the −y axis direction) when the electronic device according to one or more embodiments of the present disclosure is in the slide-in state. FIG. 5B is a schematic view of an electronic device viewed from a direction different from one direction (e.g., the y-axis direction) when the electronic device according to one or more embodiments of the present disclosure is in the slide-in state. FIG. 6A is a diagram schematically illustrating a cross-section for the D-D' line, of FIG. 5A, of an electronic device according to one or more embodiments of the present disclosure. FIG. 6B is an enlarged view of the E area, of FIG. 5B, of an electronic device according to one or more embodiments of the present disclosure. FIG. 7 is an enlarged view of a state in which a sliding member is removed in the F area, of FIG. 6B, of an electronic device according to one or more embodiments of the present disclosure.

With reference to FIG. 5A, FIG. 5B, FIG. 6, and FIG. to 7, the electronic device 200 according to one or more embodiments of the present disclosure may include a first housing 210, a second housing 220, a flexible display 230, a printed circuit board 250, a cooling member 505, a first shaft 510 (e.g., the fixed shaft), a thermal diffusion member 515, a second shaft 520 (e.g., the rotating shaft), a sliding member 530, a first guide member 541, a second guide member 542 and/or a rotating member 550.

According to embodiments, the first housing 210 (e.g., the base housing) may include a first side surface 2111 having a first length along the first direction (e.g., the x-axis direction), a second side surface 2112 extending to have a second length longer than the first length along the substantially perpendicular direction (e.g., the y-axis direction) from the first side surface 2111 and a third side surface 2113 extending in a direction (e.g., the x-axis direction) substantially parallel to the first side surface 2111 from the second side surface 2112 and having the first length.

According to embodiments, the second housing 220 (e.g., slide housing) may include a fourth side surface 2211 at least partially corresponding to the first side surface 2111 and having a third length, a fifth side surface 2212 extending in substantially parallel direction to the second side surface 2112 (e.g., the y-axis direction) from the fourth side surface 2211 and having a fourth length longer than the third length, and a sixth side surface 2213 extending corresponding to the third side surface 2113 from the fifth side surface 2212 and having a third length.

According to one or more embodiments, the second housing 220 may be configured to perform a sliding-out operation (e.g., a slide-out operation) in a designated direction (e.g., an x-axis direction) from the first housing 210, or a sliding-in operation (e.g., a slide-in operation) into the first housing 210. For example, the first side surface 2111 of the first housing 210 and the fourth side surface 2211 of the second housing 220, and the third side surface 2113 of the first housing 210 and the sixth side surface 2213 of the second housing 220 may be slidably coupled with respect to each other.

According to embodiments, the flexible display 230 may be disposed to be supported through at least a portion of the first housing 210 and the second housing 220. The flexible display 230 may be configured so that the display area is variable as the second housing 220 slides out from the first housing 210 or slides into the first housing 210.

According to one or more embodiments, the flexible display 203 may be defined as a slide-out display or an expandable display. The flexible display 230 may include a flexible substrate (e.g., a plastic substrate) formed of a polymer material including a polyimide (PI) or a polyester (PET).

According to embodiments, the printed circuit board 250 may be disposed in an inner space of the first housing 210 (e.g., the first space 2101 of FIG. 4). On one side of the printed circuit board 250, at least one electronic component 501 may be mounted and/or disposed. At least one electronic component 501 may include a processor 120 (e.g., an application processor, a communication processor), a memory 130, and/or an interface 177 disclosed in FIG. 1. At least one electronic component 501 may include a heat generating component such as a PMIC, a power amplifier, and/or an inductor. In the inner space of the first housing 210 (e.g., the first space 2101 of FIG. 4), the battery 251 may be disposed in an area that is not duplicated with the printed circuit board 250.

According to embodiments, a heat transfer member 503 may be disposed on top of the at least one electronic component 501. The heat transfer member 503 may be disposed on one surface of at least one electronic component 501. The heat transfer member 503 may transfer and/or dissipate heat generated from at least one electronic component 501 disposed on the printed circuit board 250 to the thermal diffusion member 515. The first end of the thermal diffusion member 515 may be disposed to contact the upper part of the heat transfer member 503. The heat transfer member 503 may absorb heat generated from at least one electronic component 501 or transfer it to the thermal diffusion member 515 to cool it. The heat transfer member 503 may include either a thermal interface material (TIM) tape or a graphite sheet. In embodiments, the heat transfer member 503 may not be disposed on the top of at least one electronic component 501, but the first end of the thermal diffusion member 515 may be disposed.

According to embodiments, the cooling member 505 may be disposed on the inner surface of the first side surface 2111 of the first housing 210. The cooling member 505 may be disposed at the inner end (e.g., x-axis direction) of the first side surface 2111. The cooling member 505 may include at least one wing unit 507. The cooling member 505 may be electrically connected to the electronic component 501. For example, the cooling member 505 may be electrically connected to the processor 120 of FIG. 1. The cooling member 505 may be operated under the control of the processor 120. The cooling member 505 may be turned on when the second housing 220 is sliding out (e.g., the slide-out operation) in a designated direction (e.g., the x-axis direction) from the first housing 210. The cooling member 505 may generate a convection according to the rotation of at least one wing unit 507 and cool the heat diffused through the thermal diffusion member 515. The cooling member 505 (e.g., a heat dissipation fan) may include a micro pump or a piezo pump.

According to embodiments, the first end (e.g., one end) of the first shaft 510 (e.g., a fixed shaft) may be coupled to the fourth side surface 2211 of the second housing 220 and the second end (e.g., the other end) of the first shaft 510 may be coupled to the sixth side surface 2213 of the second housing 220. The first and second ends of the first shaft 510 may be fixed to the ends (e.g., x-axis direction) of the inner surfaces of the fourth side surface 2211 and the sixth side surface 2213 of the second housing. For example, the first end of the first shaft 510 may be fixed to the fourth side surface 2211 of the second housing 220 and the second end of the first shaft 510 may be fixed to the sixth side surface 2213 so that the second shaft 520 (e.g., the rotating shaft) disposed on the outer circumferential surface of the second end can be rotated.

In embodiments, when the first shaft 510 (e.g., a fixed shaft) and the second shaft 520 (e.g., a rotating shaft) are integrally combined and the first shaft 510 and the second shaft 520 are configured to integrally rotate, the first and second ends of the first shaft 510 may be configured to be rotatable on the fourth side surface 2211 and the sixth side surface 2213 of the second housing 220.

According to one or more embodiments, the first shaft 510 (e.g., a fixed shaft) may wind at least a portion (e.g., a second end portion) of the thermal diffusion member 515. The first shaft 510 may include a body portion 512 (e.g., as in FIG. 7) that can wind at least a portion (e.g., a second end portion) of the thermal diffusion member 515. When the second housing 220 is in a sliding-in state (e.g., the slide-in state) to the first housing 210, the thermal diffusion member 515 may be at least partially wound around the first shaft 510. When the second housing 220 is in a sliding out state (e.g., the slide-out state) from the first housing 210, the thermal diffusion member 515 may be at least partially spread out in the first shaft 510 and may be disposed in the inner space (e.g., the second space 2201 of FIG. 4) of the second housing 220.

According to embodiments, the first end of the thermal diffusion member 515 may be disposed and bonded to the upper part of the heat transfer member 503. The thermal diffusion member 515 may have the first end in contact with the heat transfer member 503. The thermal diffusion member 515 may have a second end coupled to the first shaft 510 (e.g., the body portion 512). When the second housing 220 is in a sliding-in state (e.g., a slide-in state) into the first housing 210, some portion of the thermal diffusion member 515 extended from the second end may be wound around the first shaft 510 (e.g., the body portion 512). When the second housing 220 is in a sliding out state (e.g., a slide-out state) from the first housing 210, the thermal diffusion member 515 may be spread out into the inner space of the second housing 220 (e.g., the second space 2201 of FIG. 4).

According to one or more embodiments, the thermal diffusion member 515 may diffuse and dissipate heat transmitted from the heat transfer member 503 disposed on at least one electronic component 501 (e.g., a heat generating component) to the inner space of the second housing 220 (e.g., the second space 2201 of FIG. 4). The first end of the thermal diffusion member 515 may be coupled to the top surface of the heat transfer member 503 through an adhesive sheet or bonding. Since the first end of the thermal diffusion member 515 is disposed on top of the heat transfer member 503 and the second end is wound around the first shaft 510 (e.g., the body portion 512), the width of the first end may be narrower than the width of the second end. The thermal diffusion member 515 may include one of a graphite sheet, a nanofiber sheet, a nano form sheet, a copper (CU) sheet, or an aluminum (AL) sheet.

According to embodiments, the second shaft 520 (e.g., a rotating shaft) may be rotatably coupled to the outer circumferential surface of the second end of the first shaft 510 (e.g., a fixed shaft) disposed on the sixth side surface 2213 of the second housing 220. The second shaft 520 may be coupled to the sliding member 530 and the sliding member 530 may be configured to reciprocate in the first housing 210 and the second housing 220.

According to one or more embodiments, the second shaft 520 (e.g., the rotating shaft) may be disposed in the sixth side surface 2213 of the second housing 220 in the opposite direction (e.g., in the y-axis direction) to the cooling member 505 disposed on the first side surface 2111 of the first housing 210. The second shaft 520 may include a plurality of protrusions 521 and a plurality of grooves 523. A plurality of protrusions 521 and a plurality of grooves 523 formed on the second shaft 520 may be interlocked with a plurality of concaves 532 and a plurality of protrusions 524 formed on the inner surface of the sliding member 530. For example, the second shaft 520 may be coupled to the sliding member 530 in a gear manner or a gear method and enable the sliding member 530 to be sliding.

According to embodiments, the first end 530a of the sliding member 530 may be coupled and fixed to the third side surface 2113 of the first housing 210. The sliding member 530 may have a portion adjacent to the first end 530a coupled to the second shaft 520. One portion of the sliding member 530 and another portion may be disposed between the first guide member 541 and the second guide member 542. The first guide member 541 and the second guide member 542 may be fixed on the inner surface of the sixth side surface 2213 of the second housing 220. The first guide member 541 and the second guide member 542 may partially seat the sliding member 530.

According to one or more embodiments, the sliding member 530 may perform a reciprocating motion in the first direction (e.g., the −x-axis direction) and the second direction (e.g., the x-axis direction) according to the rotation of the second shaft 520 (e.g., the rotating shaft). For example, in a state that the first end 530a of the sliding member 530 is fixed to the third side surface 2113 of the first housing 210, the remaining portion of the sliding member 530 may be moved to the inner space (e.g., the first space 2101 of FIG. 4) of the first housing 210 and the inner space (e.g., the second space 2201 of FIG. 4) of the second housing 220. The sliding member 530 may include a plurality of concaves 532 and a plurality of protrusions 524 on the inner surface. A plurality of concaves 532 and a plurality of protrusions 524 formed on the inner surface of the sliding member 530 may be interlocked with a plurality of protrusions 521 and a plurality of grooves 523 formed on the outer surface of the second shaft 520 in a gear coupling manner or a gear coupling method. The sliding member 530 may be seated and disposed between the first guide member 541 and the second guide member 542, and it may be guided to reciprocate between the first guide member 541 and the second guide member 542 to the first housing 210 and the second housing 220.

According to one or more embodiments, when the second housing 220 is in a sliding-in state (e.g., the slide-in state) to the first housing 210 and no rotation of the second shaft 520 (e.g., the rotating shaft) occurs, the sliding member 530 may be in a state of being disposed in the inner space of the first housing 210 (e.g., the first space 2101 of FIG. 4) while the first end 530a is fixed to the third side surface 2113 of the first housing 210. In this case, when the first end 530a of the sliding member 530 is fixed to the third side surface 2113 of the first housing 210 and a portion connected to the first end 530a is coupled to the second shaft 520 (e.g., the rotating shaft), the remaining portion connected to the one portion may be disposed between the first guide member 541 and the second guide member 542.

In embodiments, when the second housing 220 is sliding out (e.g., the slide-out) from the first housing 210 and a rotation occurs in the second shaft 520 (e.g., the rotating shaft), the remaining portion of the sliding member 530 may be moved and disposed in the inner space (e.g., the second space 2201 of FIG. 4) of the second housing 220 in a state that the first end 530a is fixed to the third side surface 2113 of the first housing 210. In this case, the first end 530a of the sliding member 530 may be in a state of being fixed to the third side surface 2113 of the first housing 210 and the remaining portion may be in a state of mostly sliding out between the first guide member 541 and the second guide member 542 according to the rotation of the second shaft 520 (e.g., the rotating shaft).

According to embodiments, the first guide member 541 and the second guide member 542 may be disposed fixedly on the inner surface of the sixth side surface 2213 of the second housing 220. The first guide member 541 and the second guide member 542 may partially seat the sliding member 530. The first guide member 541 and the second guide member 542 may be used to guide the sliding member 530 to seat and slide out as the second shaft 520 (e.g., the rotating shaft) rotates in the first direction (e.g., the −x-axis direction) and in the second direction (e.g., the x-axis direction).

According to embodiments, the rotating member 550 may be rotatably coupled to the first side surface 2111 of the first housing 210 at the first end (e.g., one end), and the second end (e.g., the other end) may be rotatably coupled to the third side surface 2113 of the first housing 210. The rotating member 550 may be disposed at the bottom of the thermal diffusion member 515. The rotating member 550 may guide the movement of the thermal diffusion member 515. The rotating member 550 may guide the thermal diffusion member 515 to wind up on the body portion 512 of the first shaft 510 (e.g., the fixed shaft) or to unwind the body portion 512 of the first shaft 510 (e.g., the fixed shaft). At least one of the rotating members 550 may be provided to facilitate the thermal diffusion member 515 to be wound up on the body portion 512 of the first shaft 510 (e.g., the fixed shaft) or to be unwound on the body portion 512 of the first shaft 510 (e.g., the fixed shaft). For example, when a plurality of rotating members 550 are provided, the thermal diffusion member 515 may be disposed to reciprocate between a plurality of rotating members 550.

Figure 8A:
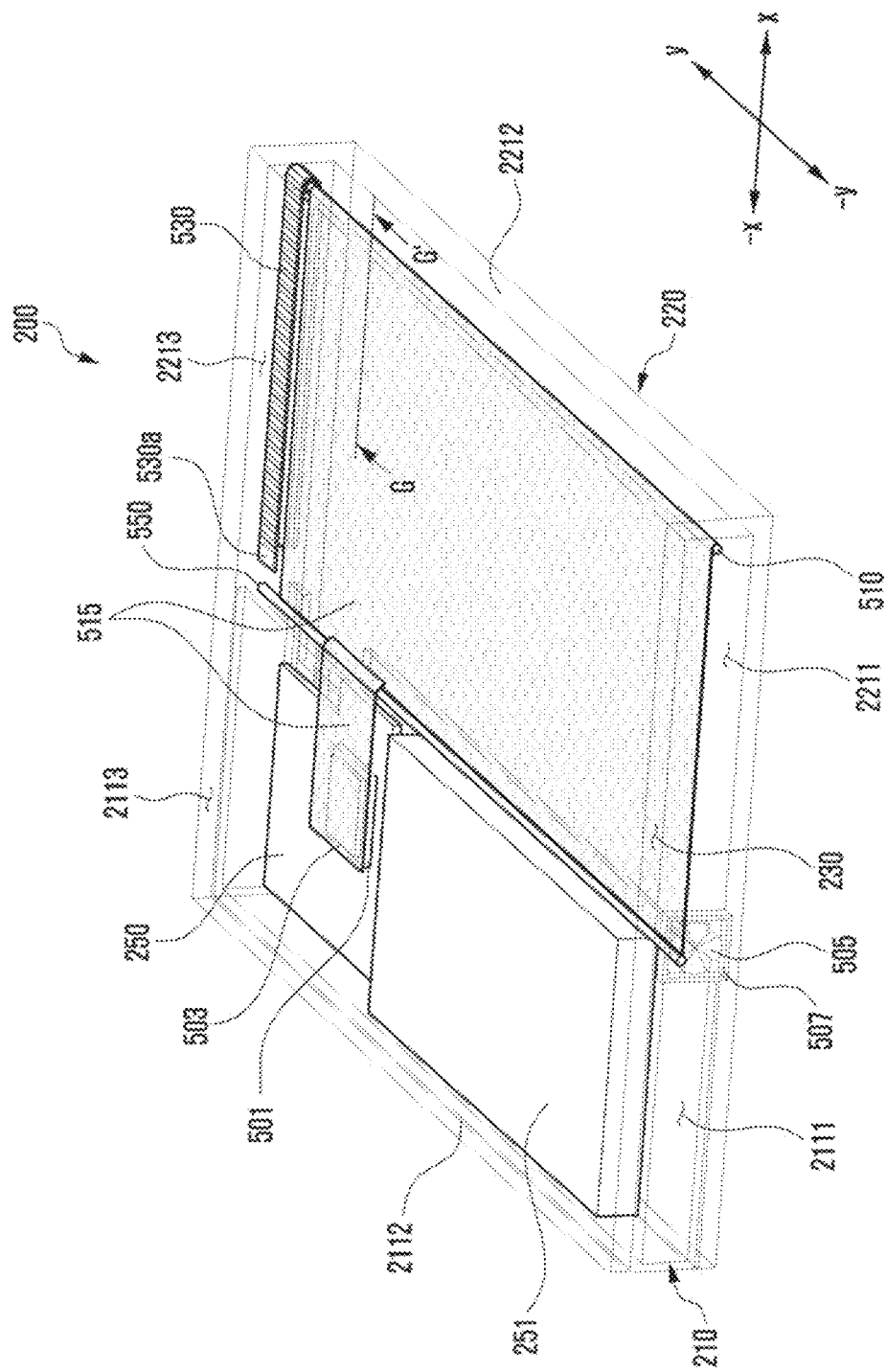
FIG. 8A is a schematic view of an electronic device viewed in one direction (e.g., the −y axis direction) when the electronic device is in a slide-out state according to one or more embodiments of the present disclosure.
Figure 8B:
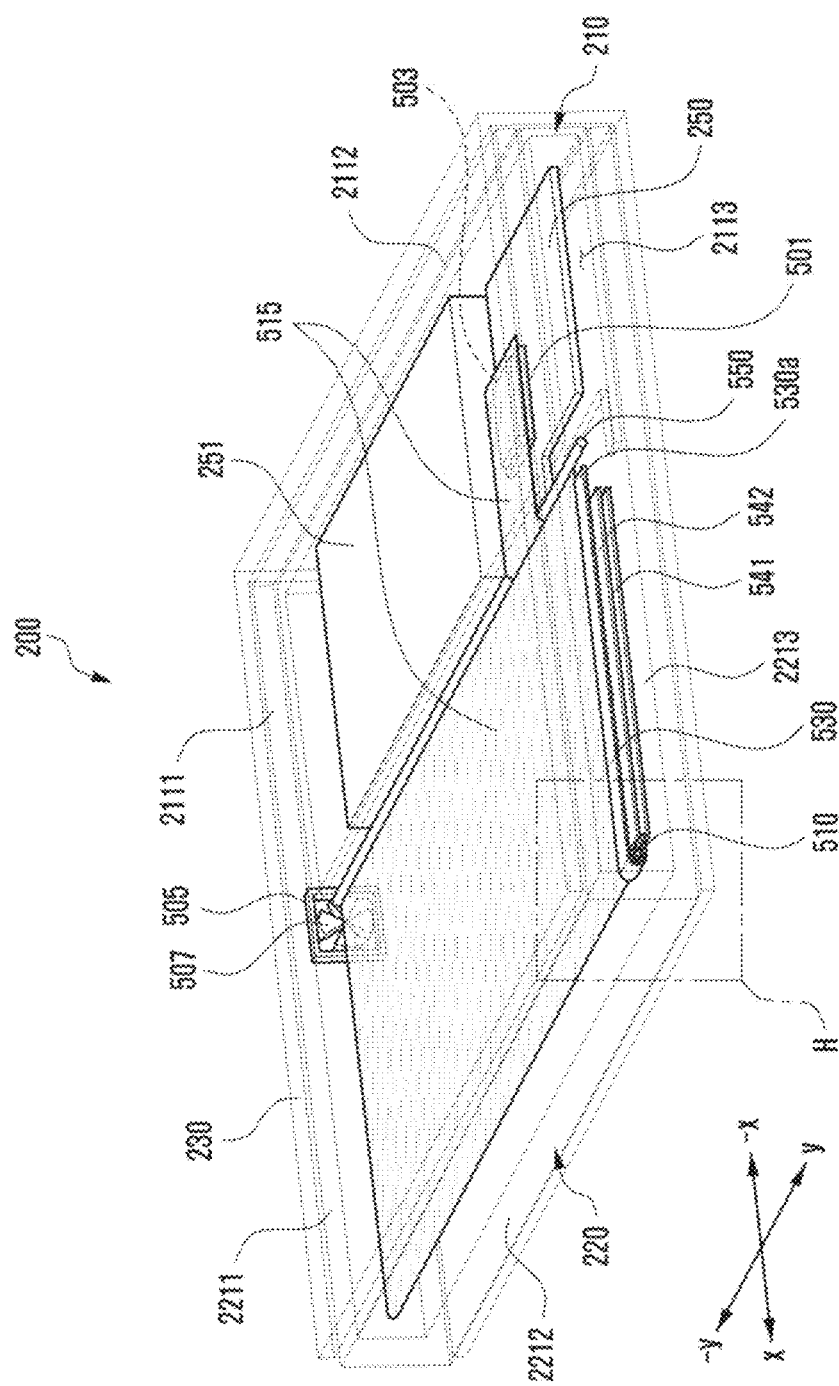
FIG. 8B is a schematic view of an electronic device viewed from a direction different from one direction (e.g., the y-axis direction) when the electronic device is in a slide-out state according to one or more embodiments of the present disclosure.

FIG. 8A is a schematic view of an electronic device viewed in one direction (e.g., the −y axis direction) when the electronic device is in a slide-out state according to one or more embodiments of the present disclosure. FIG. 8B is a schematic view of an electronic device in a slide-out state and viewed from a direction different from one direction (e.g., the y-axis direction) according to one or more embodiments of the present disclosure.

Figure 9A:
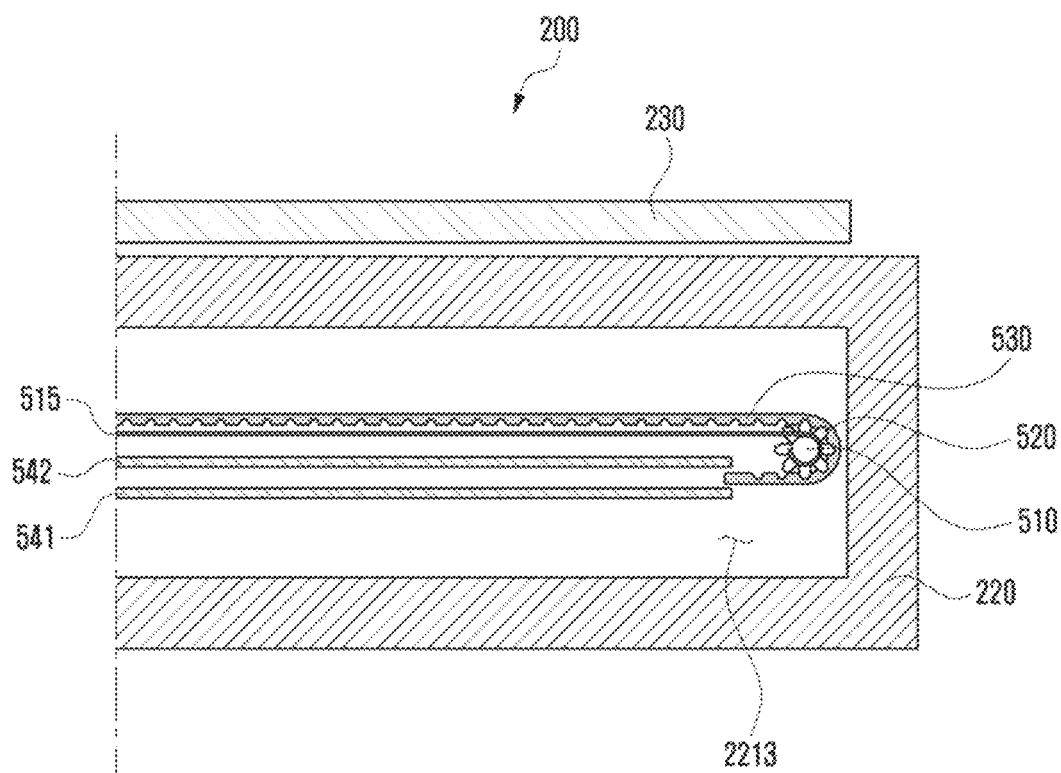
FIG. 9A is a diagram schematically illustrating a cross-section of the G-G' line, if FIG. 8A, of an electronic device according to one or more embodiments of the present disclosure.
Figure 9B:
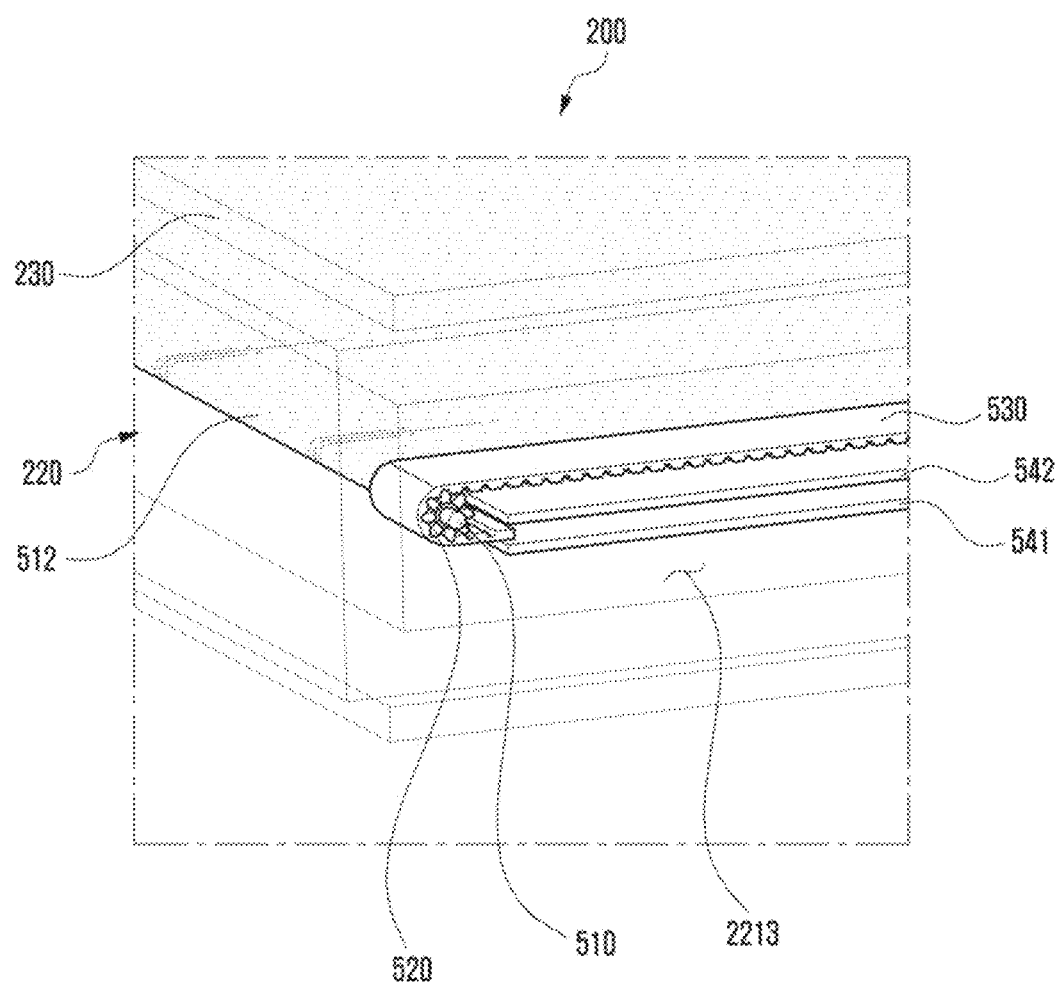
FIG. 9B is an enlarged view of the H area, of FIG. 8B, of the electronic device according to one or more embodiments of the present disclosure.

FIG. 9A is a diagram schematically illustrating a cross-section of the G-G' line, of FIG. 8A, of an electronic device according to one or more embodiments of the present disclosure. FIG. 9B is an enlarged view of the H area, of FIG. 8B, of the electronic device according to one or more embodiments of the present disclosure.

In the description of FIG. 8A, FIG. 8B, FIG. 9A, and FIG. 9B, the same reference number may be assigned for a configuration that is substantially the same as the embodiment to be disclosed in the electronic device 200 of FIG. 2A, FIG. 2B, FIG. 3A, FIG. 3B, FIG. 4, FIG. 5A, FIG. 5B, FIG. 6A, FIG. 6B, and FIG. 7 described above, and duplicate descriptions of functions and operations thereof may be omitted. For example, in FIG. 8A, FIG. 8B, FIG. 9A, and FIG. 9B, the sliding-in state (e.g., the slide-in state) of the electronic device 200 disclosed in FIG. 5A, FIG. 5B, FIG.

6A, FIG. 6B, and FIG. 7 and the sliding out state (e.g., the slide-out state) of the electronic device 200 may be described.

With reference to FIG. 8A, FIG. 8B, FIG. 9A, and FIG. 9B, in the electronic device 200 according to one or more embodiments of the present disclosure the second housing 220 may perform a sliding-out operation (e.g., a slide-out operation) in a designated direction (e.g., x-axis direction) from the first housing 210. For example, the first side surface 2111 of the first housing 210 and the fourth side surface 2211 of the second housing 220, and the third side surface 2113 of the first housing 210 and the sixth side surface 2213 of the second housing 220 may be slidably coupled with respect to each other.

According to one or more embodiments, as the second housing 220 performs a sliding-out operation (e.g., a slide-out operation) in a designated direction (e.g., x-axis direction) from the first housing 210, the flexible display 230 may expand the display area. For example, the flexible display 230 may be expanded in a designated direction (e.g., the x-axis direction) in a state that the first portion (e.g., the first portion 230a of FIG. 2B) is disposed to be supported by the first housing 210 and the second portion (e.g., the second portion 230b of FIG. 2B) is disposed to be supported by at least a portion of the sliding plate (e.g., the sliding plate 240 of FIG. 4).

According to one or more embodiments, when the second housing 220 performs a sliding-out operation (e.g., a slide-out operation) from the first housing 210 in a designated direction (e.g., x-axis direction), the thermal diffusion member 515 in which the first end is disposed on at least one heat transfer member 503 may be spread out into the inner space of the second housing 220 (e.g., the second space 2201 of FIG. 4).

According to one or more embodiments, the thermal diffusion member 515 may be at least partially spread out in the first shaft 510 when the second housing 220 is switched from the first housing 210 to a sliding out state (e.g., a slide-out state) and may be disposed in the inner space of the second housing 220 (e.g., the second space 2201 of FIG. 4). The thermal diffusion member 515 may diffuse and/or dissipate heat transferred from the heat transfer member 503 into the inner space (e.g., the second space 2201 of FIG. 4) of the second housing 220.

According to embodiments, the thermal diffusion member 515 may have a first end disposed on top of the heat transfer member 503. The thermal diffusion member 515 may have a second end coupled to the first shaft 510 (e.g., the body portion 512). When the second housing 220 is switched from the first housing 210 to a sliding out state (e.g., a slide-out state), the thermal diffusion member 515 may be spread out to the inner space of the second housing 220 (e.g., the second space 2201 of FIG. 4).

According to one or more embodiments, when the second housing 220 performs a sliding-out operation (e.g., a slide-out operation) from the first housing 210 in a designated direction (e.g., x-axis direction), a processor (e.g., a processor 120 in FIG. 1) that is one of the at least one electronic component 501 may operate the cooling member 505. If the cooling member 505 is operated, the heat diffused through the thermal diffusion member 515 can be cooled.

According to one or more embodiments, when the second housing 220 performs a sliding-out operation (e.g., a slide-out operation) from the first housing 210 in a designated direction (e.g., x-axis direction), as the second shaft 520 (e.g., the rotating shaft) rotates, the remaining portion may be moved and disposed in the inner space of the second housing (e.g., the second space 2201 of FIG. 4) in a state that the first end 530a of the sliding member 530 is fixed to the third side surface 2113 of the first housing 210. In this case, the sliding member 530 may be in a state in which the first end 530a is fixed to the third side surface 2113 of the first housing 210, and the remaining portion may be mostly sliding out between the first guide member 541 and the second guide member 542 according to the rotation of the second shaft 520 (e.g., the rotating shaft).

Figure 10A:
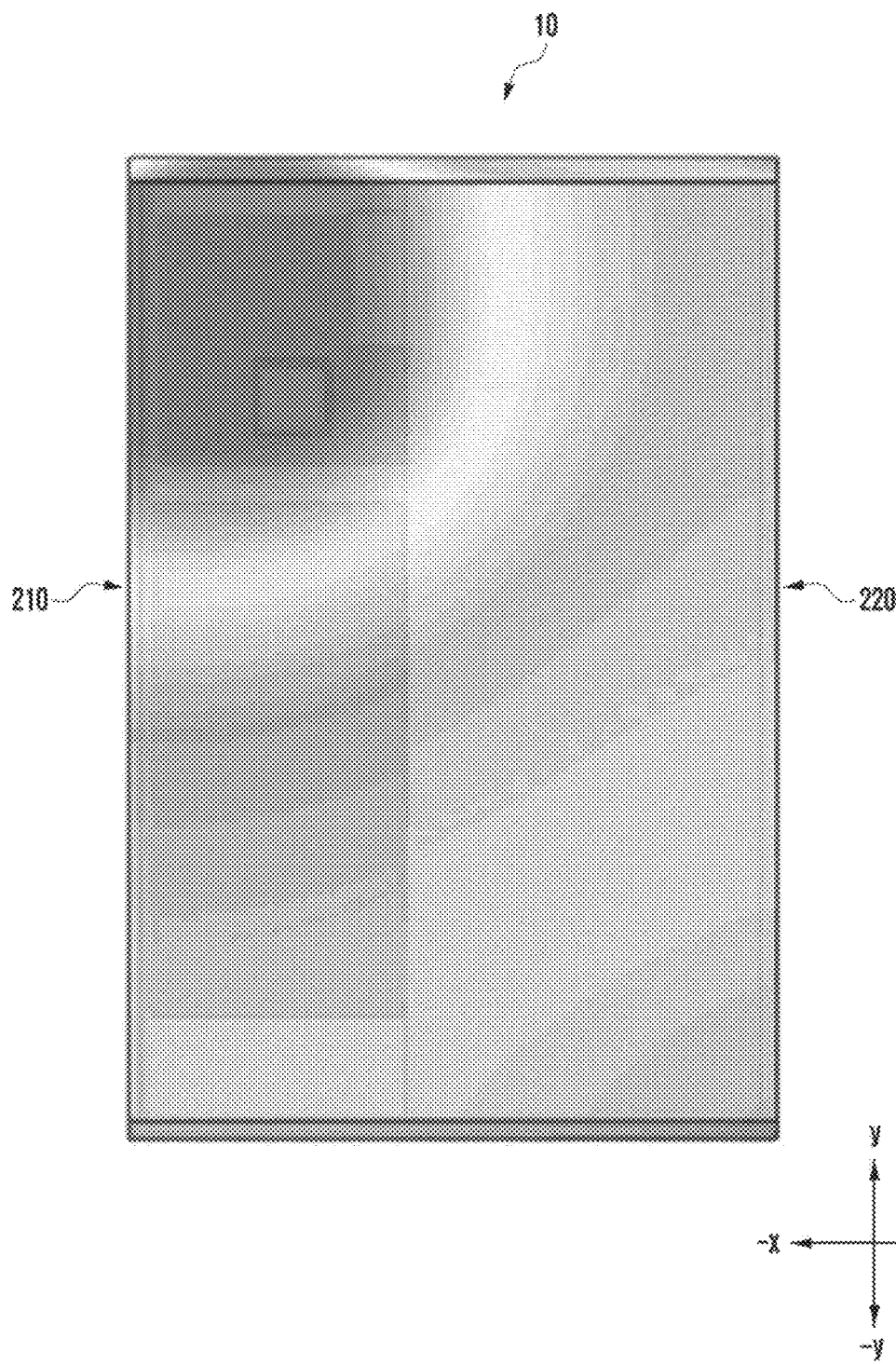
FIG. 10A is a diagram illustrating the surface temperature of an electronic device according to a comparative embodiment.
Figure 10B:
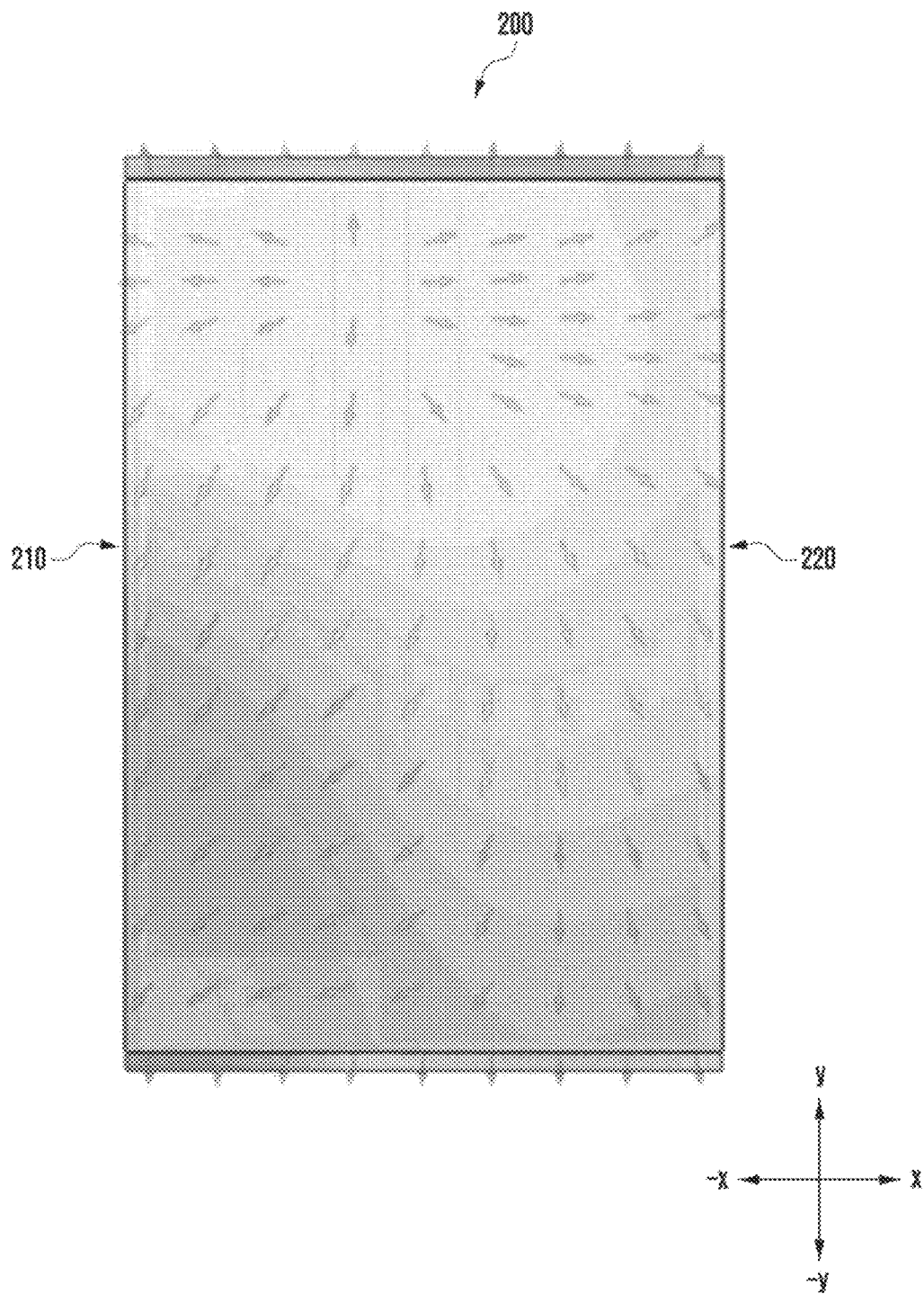
FIG. 10B is a diagram illustrating the surface temperature of an electronic device including a thermal diffusion member according to one or more embodiments of the present disclosure.

FIG. 10A is a diagram illustrating the surface temperature of an electronic device according to a comparative embodiment, and FIG. 10B is a diagram illustrating the surface temperature of an electronic device including a thermal diffusion member according to one or more embodiments of the present disclosure.

With reference to FIG. 10A, the electronic device 10 according to the comparative embodiment may be in a state in which the thermal diffusion member 515 according to one or more embodiments of the present disclosure is not disposed. The electronic device 10 according to a comparative embodiment may identify that even if the second housing 220 performs a sliding-out operation (e.g., a slide-out operation) in a designated direction (e.g., x-axis direction) from the first housing 210, the maximum temperature of the surface of the electronic device 10 is measured at 48° C. to 55° C., and the minimum temperature is measured at 30° C. to 35° C.

With reference to FIG. 10B, the electronic device 200 according to one or more embodiments of the present disclosure may be in a state in which the thermal diffusion member 515 is disposed to be spread out into the inner space of the second housing 220 (e.g., the second space 2201 of FIG. 4) in response to the second housing 220 performing a sliding-out operation (e.g., a slide-out operation) in a designated direction (e.g., in the x-axis direction) from the first housing 210. In the electronic device 200 according to one or more embodiments of the present disclosure, the thermal diffusion member 515 may be spread out in the inner space of the second housing 220 (e.g., the second space 2201 of FIG. 4) when the second housing 220 performs a sliding-out operation (e.g., a slide-out operation) in a designated direction (e.g., an x-axis direction) from the first housing 210. Accordingly, it may be identified that the maximum temperature of the surface of the electronic device 200 according to one or more embodiments of the present disclosure is measured at 34° C. to 46° C., and the minimum temperature is measured at 23° C. to 29° C.

According to embodiments, it may be identified that the maximum temperature of the surface of the electronic device 200 is lowered by 9° C. to 12° C. compared to the electronic device 10 according to the comparison embodiment.

According to embodiments, it may be identified that the minimum temperature of the surface of the electronic device 200 is lowered by 6° C. to 7° C. compared to the electronic device 10 according to the comparative embodiment.

An electronic device 200 (e.g., the electronic device 101 of FIG. 1) according to one or more embodiments of the present disclosure comprises: a first housing 210 including a first side surface 2111, a second side surface 2112, and a third side surface 2113; a second housing 220 including a fourth side surface 2211, a fifth side surface 2212, and a sixth side surface 2213 and coupled to the first housing 210 to be slidable in and out; a sliding plate 240 having a first end coupled to the first housing 210 and disposed such that a second end is at least partially slid within the second housing 220; a flexible display 230 supported by at least a portion of the first housing 210 and the second housing 220 and having a display area that is variable as the second housing 220 slides in and out with respect to the first housing 210; a printed circuit board 250 disposed in the inner space (e.g., the first space 2101 of FIG. 4) of the first housing 210 and having at least one electronic component 501 mounted on one surface thereof; a first shaft 510 having a first end coupled to the fourth side surface 2211 of the second housing 220 and a second end coupled to the sixth side surface 2213 of the second housing 220; and a thermal diffusion member 515 having a first end disposed on the at least one electronic component 501 and partially wound while the second end is coupled to the first shaft 510, wherein the thermal diffusion member 515 may be configured such that at least a portion thereof is spread out in the inner space (e.g., the second space 2202 of FIG. 4) of the second housing 220 as the second housing 220 performs a sliding-out operation with respect to the first housing 210.

According to one or more embodiments, the at least one electronic component 501 may include at least one of an application processor, a communication processor, a PMIC, a power amplifier, or an inductor.

According to one or more embodiments, a heat transfer member 503 may be disposed between the first end of the at least one electronic component 501 and the thermal diffusion member 515.

According to one or more embodiments, the cooling member 505 operated when the second housing 220 performs a sliding-out operation with respect to the first housing 210 may be disposed on the surface of the first side surface 2111 of the first housing.

According to one or more embodiments, the cooling member 505 may include one of a micropump or a piezo pump.

According to one or more embodiments, the first end of the first shaft 510 may be coupled to the fourth side surface 2211 of the second housing 220, and the second end may be fixedly coupled to the sixth side surface 2213 of the second housing 220.

According to one or more embodiments, on the outer circumference surface of the second end of the first shaft 510, the second shaft 520 may be disposed so that it can be rotated in the first shaft 510.

According to one or more embodiments, the first shaft 510 may include a body portion 512 capable of winding a portion of the thermal diffusion member 515.

According to one or more embodiments, the width of the first end of the thermal diffusion member 515 may be narrower than the width of the second end.

According to one or more embodiments, the thermal diffusion member 515 may include one of a graphite sheet, a nanofiber sheet, a nanofoam sheet, a copper sheet, or an aluminum sheet.

According to one or more embodiments, on the outer surface of the second shaft 520, a sliding member 530 configured to reciprocate between the first housing 210 and the second housing 220 may be coupled in a gear manner or in a gear method.

According to one or more embodiments, the sliding member 530 may have a first end 530a coupled to the third side surface 2113 of the first housing 210.

According to one or more embodiments, the sliding member 530 may be partially provided between the first guide member 541 and the second guide member 542 disposed on the surface of the sixth side surface 2213 of the second housing 220.

According to one or more embodiments, when the second housing 220 is sliding out from the first housing 210 and rotation occurs in the second shaft 520, the remaining portion of the sliding member 530 may be disposed to be moved to the inner space (e.g., the second space 2201 of FIG. 4) of the second housing 220 in a state where the first end 530a of the sliding member 530 is fixed to the third side surface 2113 of the first housing 210.

According to one or more embodiments, at least one rotating member 550, of which the first end is rotatably coupled to the first side surface 2111 of the first housing 210 and the second end is rotatably coupled to the third side surface 2113 of the first housing 210, may be further included.

An electronic device 200 (e.g., the electronic device 101 of FIG. 1) according to one or more embodiments of the present disclosure comprises: a first housing 210 including a first side surface 2111, a second side surface 2112, and a third side surface 2113; a second housing 220 including a fourth side surface 2211, a fifth side surface 2212, and a sixth side surface 2213 and coupled to the first housing 210 to be slidable in and out; a sliding plate 240 having a first end coupled to the first housing 210 and disposed such that a second end is at least partially slid within the second housing 220; a flexible display 230 supported by at least a portion of the first housing 210 and the second housing 220 and having a display area that is variable as the second housing 220 slides in and out with respect to the first housing 210; a printed circuit board 250 disposed in the inner space (e.g., the first space 2101 of FIG. 4) of the first housing 210 and having at least one electronic component 501 mounted on one surface thereof; a first shaft 510 having a first end coupled to the fourth side surface 2211 of the second housing 220 and a second end coupled to the sixth side surface 2213 of the second housing 220; a thermal diffusion member 515 having a first end disposed on the at least one electronic component 501 and partially wound while the second end is coupled to the first shaft 510; and a cooling member 505 disposed on an inner surface of the first side surface 2111 of the first housing 210 and operated when the second housing 220 slides out with respect to the first housing 210, wherein the thermal diffusion member 515 may be configured such that at least a portion thereof is spread out in the inner space (e.g., the second space 2202 of FIG. 4) of the second housing 220 as the second housing 220 performs a sliding-out operation with respect to the first housing 210.

According to one or more embodiments, a heat transfer member 503 may be disposed between the first end of the at least one electronic component 501 and the thermal diffusion member 515.

According to one or more embodiments, the first end of the first shaft 510 may be coupled to the fourth side surface 2211 of the second housing 220, the second end may be fixedly coupled to the sixth side surface 2213 of the second housing 220, and the second shaft 520 may be disposed on the outer circumference surface of the second end of the first shaft 510 so that it can be rotatable at the first shaft 510.

According to one or more embodiments, on the outer surface of the second shaft 520, a sliding member 530 configured to reciprocate between the first housing 210 and the second housing 220 may be coupled in a gear manner or in a gear method.

According to one or more embodiments, at least one rotating member 550, of which the first end is rotatably coupled to the first side surface 2111 of the first housing 210 and the second end is rotatably coupled to the third side surface 2113 of the first housing 210, may be further included.

Although the present disclosure has been described in accordance with various embodiments of the present disclosure, it is natural that a change and a modification within a range that does not depart from the technical spirit of the disclosure by a person having ordinary knowledge in the art to which the disclosure pertains also belongs to the disclosure.

What is claimed is:

1. An electronic device comprising:
   a first housing comprising a first side surface, a second side surface, and a third side surface;
   a second housing comprising a fourth side surface, a fifth side surface, and a sixth side surface, the second housing being configured to be slidable into and out of the first housing;
   a sliding plate comprising a first end coupled to the first housing, and a second end configured to be at least partially slid within the second housing;
   a flexible display supported by the first housing and the second housing and comprising a display area that varies as the second housing slides into and out of the first housing;
   a printed circuit board disposed in an inner space of the first housing;
   at least one electronic component mounted on a side of the printed circuit board;
   a first shaft comprising a first end coupled to the fourth side surface of the second housing, and a second end coupled to the sixth side surface of the second housing; and
   a thermal diffusion member comprising a first end disposed on the at least one electronic component and a second end coupled to the first shaft, the thermal diffusion member being configured to be partially wound around and unwound from the first shaft,
   wherein the thermal diffusion member is configured such that at least a portion of the thermal diffusion member spreads out in an inner space of the second housing as a sliding-out operation is performed by the second housing with respect to the first housing.

2. The electronic device of claim 1, wherein the at least one electronic component comprises at least one of an application processor, a communication processor, a power management integrated circuit (PMIC), a power amplifier, or an inductor.

3. The electronic device of claim 1, further comprising:
   a heat transfer member disposed between the at least one electronic component and the first end of the thermal diffusion member.

4. The electronic device of claim 1, further comprising:
   a cooling member disposed on an inner surface of the first side surface of the first housing and configured to operate when the sliding-out operation is performed.

5. The electronic device of claim 4, wherein the cooling member comprises one of a micropump or a piezo pump.

6. The electronic device of claim 1, wherein the first end of the first shaft is coupled to the fourth side surface of the second housing, and
   the second end of the first shaft is coupled to the sixth side surface of the second housing.

7. The electronic device of claim 6, further comprising:
   a second shaft disposed on an outer circumferential surface of the second end of the first shaft, the second shaft being configured to be rotated along with a rotation of the first shaft.

8. The electronic device of claim 7, wherein the first shaft comprises a body portion configured to wind the thermal diffusion member.

9. The electronic device of claim 1, wherein a width of the first end of the thermal diffusion member is narrower than a width of the second end of the thermal diffusion member.

10. The electronic device of claim 1, wherein the thermal diffusion member comprises one of a graphite sheet, a nanofiber sheet, a nanofoam sheet, a copper sheet, or an aluminum sheet.

11. The electronic device of claim 7, further comprising:
    a sliding member on an outer surface of the second shaft, the sliding member being configured to reciprocate, by one or more gears, between the first housing and the second housing.

12. The electronic device of claim 11, wherein a first end of the sliding member is coupled to the third side surface of the first housing.

13. The electronic device of claim 12, further comprising:
    a first guide member and a second guide member disposed on an inner surface of the sixth side surface of the second housing,
    wherein the sliding member is partially provided between the first guide member and the second guide member.

14. The electronic device of claim 12, wherein, when the second housing slides out from the first housing and a rotation occurs in the second shaft, a remaining portion of the sliding member is moved and disposed in the inner space of the second housing in a state that the first end of the sliding member is fixed to the third side surface of the first housing.

15. The electronic device of claim 1, further comprising:
    a rotating member comprising a first end rotatably coupled to the first side surface of the first housing, and a second end rotatably coupled to the third side surface of the first housing.

* * * * *